United States Patent
Kupratis et al.

(10) Patent No.: US 12,385,449 B2
(45) Date of Patent: Aug. 12, 2025

(54) SPLITTER AND GUIDE VANE ARRANGEMENT FOR GAS TURBINE ENGINES

(71) Applicant: RTX CORPORATION, Farmington, CT (US)

(72) Inventors: Daniel Bernard Kupratis, Wallingford, CT (US); Paul R. Hanrahan, Farmington, CT (US)

(73) Assignee: RTX CORPORATION, Farmington, CT (US)

( * ) Notice: Subject to any disclaimer, the term of this patent is extended or adjusted under 35 U.S.C. 154(b) by 167 days.

(21) Appl. No.: 18/461,709

(22) Filed: Sep. 6, 2023

(65) Prior Publication Data
US 2023/0407817 A1    Dec. 21, 2023

Related U.S. Application Data

(63) Continuation of application No. 16/891,492, filed on Jun. 3, 2020, now Pat. No. 11,781,506.

(51) Int. Cl.
*F02K 3/077* (2006.01)
*F01D 5/14* (2006.01)
(Continued)

(52) U.S. Cl.
CPC .............. *F02K 3/077* (2013.01); *F02K 3/075* (2013.01); *F01D 5/145* (2013.01); *F02K 1/72* (2013.01);
(Continued)

(58) Field of Classification Search
CPC ...... F02C 7/18–185; F02C 7/052; F02C 6/08; F02C 9/18; F02C 7/04–057; F02K 1/72;
(Continued)

(56) References Cited

U.S. PATENT DOCUMENTS 2,258,792 A    10/1941   New
2,936,655 A    5/1960    Peterson et al.
(Continued)

FOREIGN PATENT DOCUMENTS

EP    0791383 A1    8/1997
EP    1142850 A1    10/2001
(Continued)

OTHER PUBLICATIONS

McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
(Continued)

*Primary Examiner* — Stephanie Sebasco Cheng
(74) *Attorney, Agent, or Firm* — Carlson, Gaskey & Olds, P.C.

(57) ABSTRACT

A section for a gas turbine engine according to an example of the present disclosure includes, among other things, a rotor including a row of blades extending in a radial direction outwardly from a hub. The row of blades deliver flow to a bypass flow path, an intermediate flow path, and a core flow path. A first case surrounds the row of blades to establish the bypass flow path. A first flow splitter divides flow between the bypass flow path and a second duct. An aftmost row of guide vanes extends in the radial direction across the bypass flow path. A second flow splitter radially inboard of the first flow splitter divides flow from the second duct between the intermediate flow path and the core flow path. A bypass port interconnects the intermediate and bypass flow paths.

19 Claims, 15 Drawing Sheets

(51) Int. Cl.
*F02K 1/72* (2006.01)
*F02K 3/06* (2006.01)
*F02K 3/075* (2006.01)
*F04D 29/54* (2006.01)
*F04D 29/66* (2006.01)

(52) U.S. Cl.
CPC .............. *F02K 3/06* (2013.01); *F04D 29/542* (2013.01); *F04D 29/661* (2013.01)

(58) Field of Classification Search
CPC ...... F02K 1/68; F02K 1/54–766; F02K 3/077; F02K 3/075; F02K 3/115; F02K 3/04–06; F02K 3/068; F02K 3/045; F02K 3/044; F02K 3/00–77; F05D 2240/12–125; F05D 2260/231; F05D 2270/101–1024; F01D 5/146; F01D 9/00–048; F04D 29/464; F04D 29/542–545; F04D 29/681
See application file for complete search history.

(56) References Cited

U.S. PATENT DOCUMENTS

| | | | |
|---|---|---|---|
| 3,021,731 A | 2/1962 | Stoeckicht | |
| 3,194,487 A | 7/1965 | Tyler et al. | |
| 3,287,906 A | 11/1966 | McCormick | |
| 3,352,178 A | 11/1967 | Lindgren et al. | |
| 3,412,560 A | 11/1968 | Gaubatz | |
| 3,664,612 A | 5/1972 | Skidmore et al. | |
| 3,747,343 A | 7/1973 | Rosen | |
| 3,754,484 A | 8/1973 | Roberts | |
| 3,765,623 A | 10/1973 | Donelson et al. | |
| 3,820,719 A | 6/1974 | Clark et al. | |
| 3,843,277 A | 10/1974 | Ehrich | |
| 3,892,358 A | 7/1975 | Gisslen | |
| 3,932,058 A | 1/1976 | Harner et al. | |
| 3,935,558 A | 1/1976 | Miller et al. | |
| 3,988,889 A | 11/1976 | Chamay et al. | |
| 4,055,042 A * | 10/1977 | Colley ................. | F02K 3/06 415/77 |
| 4,080,785 A | 3/1978 | Koff et al. | |
| 4,130,872 A | 12/1978 | Haloff | |
| 4,220,171 A | 9/1980 | Ruehr et al. | |
| 4,240,250 A | 12/1980 | Harris | |
| 4,284,174 A | 8/1981 | Salvana et al. | |
| 4,289,360 A | 9/1981 | Zirin | |
| 4,478,551 A | 10/1984 | Honeycutt, Jr. et al. | |
| 4,559,784 A | 12/1985 | Jenny et al. | |
| 4,649,114 A | 3/1987 | Miltenburger et al. | |
| 4,696,156 A | 9/1987 | Burr et al. | |
| 4,722,357 A | 2/1988 | Wynosky | |
| 4,896,499 A | 1/1990 | Rice | |
| 4,916,894 A | 4/1990 | Adamson et al. | |
| 4,979,362 A | 12/1990 | Vershure, Jr. | |
| 5,003,773 A | 4/1991 | Beckwith | |
| 5,058,379 A | 10/1991 | Lardellier | |
| 5,058,617 A | 10/1991 | Stockman et al. | |
| 5,102,379 A | 4/1992 | Pagluica et al. | |
| 5,141,400 A | 8/1992 | Murphy et al. | |
| 5,169,288 A | 12/1992 | Gliebe et al. | |
| 5,174,525 A | 12/1992 | Schilling | |
| 5,261,227 A | 11/1993 | Giffin, III | |
| 5,317,877 A | 6/1994 | Stuart | |
| 5,361,580 A | 11/1994 | Ciokajlo et al. | |
| 5,433,674 A | 7/1995 | Sheridan et al. | |
| 5,447,411 A | 9/1995 | Curley et al. | |
| 5,466,198 A | 11/1995 | McKibbin et al. | |
| 5,524,847 A | 6/1996 | Brodell et al. | |
| 5,634,767 A | 6/1997 | Dawson | |
| 5,677,060 A | 10/1997 | Terentieva et al. | |
| 5,694,768 A | 12/1997 | Johnson et al. | |
| 5,746,391 A | 5/1998 | Rodgers et al. | |
| 5,778,659 A | 7/1998 | Duesler et al. | |
| 5,794,432 A | 8/1998 | Dunbar et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 5,985,470 A | 11/1999 | Spitsberg et al. | |
| 6,134,880 A | 10/2000 | Yoshinaka | |
| 6,223,616 B1 | 5/2001 | Sheridan | |
| 6,315,815 B1 | 11/2001 | Spadaccini et al. | |
| 6,318,070 B1 | 11/2001 | Rey et al. | |
| 6,387,456 B1 | 5/2002 | Eaton, Jr. et al. | |
| 6,517,341 B1 | 2/2003 | Brun et al. | |
| 6,607,165 B1 | 8/2003 | Manteiga et al. | |
| 6,619,030 B1 | 9/2003 | Seda et al. | |
| 6,709,492 B1 | 3/2004 | Spadaccini et al. | |
| 6,732,502 B2 | 5/2004 | Seda et al. | |
| 6,814,541 B2 | 11/2004 | Evans et al. | |
| 6,883,303 B1 | 4/2005 | Seda | |
| 7,021,042 B2 | 4/2006 | Law | |
| 7,195,456 B2 | 3/2007 | Aggarwala et al. | |
| 7,219,490 B2 | 5/2007 | Dev | |
| 7,328,580 B2 | 2/2008 | Lee et al. | |
| 7,374,403 B2 | 5/2008 | Decker et al. | |
| 7,437,877 B2 | 10/2008 | Kawamoto et al. | |
| 7,484,356 B1 | 2/2009 | Lair | |
| 7,591,754 B2 | 9/2009 | Duong et al. | |
| 7,632,064 B2 | 12/2009 | Somanath et al. | |
| 7,662,059 B2 | 2/2010 | McCune | |
| 7,762,086 B2 | 7/2010 | Schwark | |
| 7,785,066 B2 | 8/2010 | Bil et al. | |
| 7,806,651 B2 | 10/2010 | Kennepohl et al. | |
| 7,824,305 B2 | 11/2010 | Duong et al. | |
| 7,828,682 B2 | 11/2010 | Smook | |
| 7,926,260 B2 | 4/2011 | Sheridan et al. | |
| 7,955,046 B2 | 6/2011 | McCune et al. | |
| 7,997,868 B1 | 8/2011 | Liang | |
| 8,075,261 B2 | 12/2011 | Merry et al. | |
| 8,128,021 B2 | 3/2012 | Suciu et al. | |
| 8,205,432 B2 | 6/2012 | Sheridan | |
| 8,277,174 B2 | 10/2012 | Hasel et al. | |
| 9,121,412 B2 | 9/2015 | Gallagher et al. | |
| 9,140,188 B2 | 9/2015 | Kupratis | |
| 9,623,976 B2 * | 4/2017 | James ................... | B64D 33/04 |
| 9,964,037 B2 | 5/2018 | Snyder et al. | |
| 10,030,606 B2 * | 7/2018 | Moon ...................... | F02K 1/46 |
| 10,161,316 B2 | 12/2018 | Kupratis et al. | |
| 10,184,426 B2 | 1/2019 | Schrell | |
| 10,364,750 B2 * | 7/2019 | Rambo ................... | F02K 3/115 |
| 10,670,040 B2 | 6/2020 | Nolcheff et al. | |
| 10,774,788 B2 * | 9/2020 | Feulner ................. | F02C 3/045 |
| 10,927,761 B2 | 2/2021 | Rambo | |
| 11,448,131 B2 * | 9/2022 | Rambo ................... | F02K 3/075 |
| 11,994,089 B2 * | 5/2024 | Sidelkovskiy ........ | F04D 29/323 |
| 2001/0035004 A1 | 11/2001 | Balzer | |
| 2002/0069637 A1 | 6/2002 | Becquerelle et al. | |
| 2006/0228206 A1 | 10/2006 | Decker et al. | |
| 2007/0245739 A1 | 10/2007 | Stretton et al. | |
| 2008/0003096 A1 | 1/2008 | Kohli et al. | |
| 2008/0092548 A1 | 4/2008 | Morford et al. | |
| 2008/0116009 A1 | 5/2008 | Sheridan et al. | |
| 2008/0149445 A1 | 6/2008 | Kern et al. | |
| 2008/0190095 A1 | 8/2008 | Baran | |
| 2008/0219849 A1 | 9/2008 | Decker et al. | |
| 2008/0224018 A1 | 9/2008 | Lafont et al. | |
| 2008/0317588 A1 | 12/2008 | Grabowski et al. | |
| 2009/0056343 A1 | 3/2009 | Suciu et al. | |
| 2009/0081035 A1 | 3/2009 | Merry et al. | |
| 2009/0293445 A1 | 12/2009 | Ress, Jr. | |
| 2009/0304518 A1 | 12/2009 | Kodama et al. | |
| 2009/0314881 A1 | 12/2009 | Suciu et al. | |
| 2010/0105516 A1 | 4/2010 | Sheridan et al. | |
| 2010/0146933 A1 | 6/2010 | Caruel | |
| 2010/0148396 A1 | 6/2010 | Xie et al. | |
| 2010/0212281 A1 | 8/2010 | Sheridan | |
| 2010/0218483 A1 | 9/2010 | Smith | |
| 2010/0219779 A1 | 9/2010 | Bradbrook | |
| 2010/0331139 A1 | 12/2010 | McCune | |
| 2011/0056208 A1 | 3/2011 | Norris et al. | |
| 2011/0159797 A1 | 6/2011 | Beltman et al. | |
| 2011/0293423 A1 | 12/2011 | Bunker et al. | |
| 2012/0099963 A1 | 4/2012 | Suciu et al. | |
| 2012/0124964 A1 | 5/2012 | Hasel et al. | |

(56) References Cited

U.S. PATENT DOCUMENTS

| | | | |
|---|---|---|---|
| 2012/0247571 | A1 | 10/2012 | Vauchel et al. |
| 2012/0291449 | A1 | 11/2012 | Adams et al. |
| 2013/0008144 | A1 | 1/2013 | Gallagher et al. |
| 2013/0008170 | A1 | 1/2013 | Gallagher et al. |
| 2013/0149112 | A1 | 6/2013 | Kohlenberg et al. |
| 2013/0149113 | A1 | 6/2013 | Kohlenberg et al. |
| 2013/0192196 | A1 | 8/2013 | Suciu et al. |
| 2013/0192200 | A1 | 8/2013 | Kupratis et al. |
| 2013/0202415 | A1 | 8/2013 | Karl et al. |
| 2013/0216364 | A1 | 8/2013 | Evans |
| 2014/0157754 | A1 | 6/2014 | Hasel et al. |
| 2014/0165534 | A1 | 6/2014 | Hasel et al. |
| 2014/0271163 | A1 | 9/2014 | Hue et al. |
| 2014/0318149 | A1 | 10/2014 | Guillon et al. |
| 2014/0363276 | A1 | 12/2014 | Vetters et al. |
| 2015/0233250 | A1 | 8/2015 | Gallagher et al. |
| 2016/0040605 | A1 | 2/2016 | Howarth |
| 2016/0069275 | A1 | 3/2016 | Lecordix et al. |
| 2016/0131084 | A1 | 5/2016 | Kupratis et al. |
| 2016/0298550 | A1* | 10/2016 | Kupratis ............... F02C 9/18 |
| 2017/0089299 | A1* | 3/2017 | Kupratis ............... F02C 3/145 |
| 2017/0096945 | A1 | 4/2017 | Mueller et al. |
| 2017/0191500 | A1 | 7/2017 | Lobocki et al. |
| 2017/0314471 | A1 | 11/2017 | Sennoun |
| 2017/0314562 | A1 | 11/2017 | Rose |
| 2018/0030926 | A1 | 2/2018 | Eckett et al. |
| 2019/0017446 | A1 | 1/2019 | Adams et al. |
| 2019/0048826 | A1 | 2/2019 | Pointon et al. |
| 2019/0063370 | A1 | 2/2019 | Phelps et al. |

FOREIGN PATENT DOCUMENTS

| | | | |
|---|---|---|---|
| EP | 1340903 | A2 | 9/2003 |
| EP | 1712738 | A2 | 10/2006 |
| EP | 1976758 | B1 | 7/2010 |
| EP | 2374995 | A2 | 10/2011 |
| EP | 2383434 | A2 | 11/2011 |
| EP | 2428644 | A1 | 3/2012 |
| EP | 2480779 | A1 | 8/2012 |
| EP | 2610460 | A2 | 7/2013 |
| EP | 3070266 | A2 | 9/2016 |
| EP | 3489461 | A2 | 5/2019 |
| FR | 2991670 | B1 | 6/2014 |
| FR | 3002785 | A1 | 9/2014 |
| GB | 1516041 | A | 6/1978 |
| GB | 2041090 | A | 9/1980 |
| GB | 2165892 | A | 4/1986 |
| GB | 2426792 | A | 12/2006 |
| WO | 2007038674 | A1 | 4/2007 |
| WO | 2009148655 | A2 | 12/2009 |
| WO | 2010042215 | A1 | 4/2010 |
| WO | 2013064762 | A1 | 5/2013 |
| WO | 2013186475 | A1 | 12/2013 |
| WO | 2014091110 | A1 | 6/2014 |
| WO | 2014147343 | A1 | 9/2014 |
| WO | 2014176427 | A1 | 10/2014 |
| WO | 2015006005 | A1 | 1/2015 |

OTHER PUBLICATIONS

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Meier N. (2005) Civil Turbojet/Turbofan Specifications. Retrieved from http://jet-engine.net/civtfspec.html.

Merriam-Webster's collegiate dictionary, 10th Ed. (2001). p. 1125-1126.

Merriam-Webster's collegiate dictionary, 11th Ed. (2009). p. 824.

Meyer, A.G. (1988). Transmission development of TEXTRON Lycoming's geared fan engine. Technical Paper. Oct. 1988. pp. 1-12.

Middleton, P. (1971). 614: VFW's jet feederliner. Flight International, Nov. 4, 1971. p. 725, 729-732.

Misel, O.W. (1977). QCSEE main reduction gears test program. NASA CR-134669. Mar. 1, 1977. pp. 1-222.

Moxon, J. How to save fuel in tomorrow's engines. Flight International. Jul. 30, 1983. 3873(124). pp. 272-273.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Munt, R. (1981). Aircraft technology assessment: Progress in low emissions engine. Technical Report. May 1981. pp. 1-171.

Nanocor Technical Data for Epoxy Nanocomposites using Nanomer 1.30E Nanoclay. Nnacor, Inc. Oct. 2004.

NASA Conference Publication. (1978). CTOL transport technology. NASA-CP-2036-PT-1. Jun. 1, 1978. pp. 1-531.

NASA Conference Publication. Quiet, powered-lift propulsion. Cleveland, Ohio. Nov. 14-15, 1978. pp. 1-420.

Neitzel, R., Lee, R., and Chamay, A.J. (1973). Engine and installation preliminary design. Jun. 1, 1973. pp. 1-333.

Neitzel, R.E., Hirschkron, R. and Johnston, R.P. (1976). Study of unconventional aircraft engines designed for low energy consumption. NASA-CR-135136. Dec. 1, 1976. pp. 1-153.

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 1986. pp. 1-101.

Nexcelle Press Release. Nexcelle highlights its key role for CFM International's LEAP-1C integrated propulsion system on the COMAC C919. Retrieved Dec. 17, 2014, from http://www.nexcelle.com/news-press-release/2008-2014/11-10-2014.asp.

Norris, G. (2009). Aeronautics/propulsion laureate; Pratt Whitney's geared turbofan development team. Aviation Week Space Technology. Mar. 16, 2016. Republished in Pratt& Whitney Digital Press Kit. p. 10.

Norton, M. and Karczub, D. (2003). Fundamentals of noise and vibration analysis for engineers. Press Syndicate of the University of Cambridge. New York: New York. p. 524.

Notice of Opposition of European Patent No. 3239459 mailed Oct. 2, 2019 by Safran Aircraft Engines.

Oates, G.C. (Ed). (1989). Aircraft propulsion systems and technology and design. Washington, D.C.: American Institute of Aeronautics, Inc. pp. 341-344.

Parametric study of STOL short-haul transport engine cycles and operational techniques to minimize community noise impact. NASA-CR-114759. Jun. 1, 1974. pp. 1-397.

Parker, R.G. and Lin, J. (2001). Modeling, modal properties, and mesh stiffness variation instabilities of planetary gears. Prepared for NASA. NASA/CR-2001-210939. May 2001. pp. 1-111.

Patent Owner's Response in U.S. Pat. No. 9, 121,412, *General Electric Company*, Petition, V. *United Technologies Corporation*, Patent Owner: IPR2016-00952 filed Jan. 27, 2017, pp. 1-75.

Patentee's Request to Notice of Opposition to U.S. Pat. No. 2,776,677B, United Technologies Corporation opposed by SNECMA dated Sep. 12, 2016.

Petition for Inter Partes Review of U.S. Pat. No. 9,121,412. *General Electric Company*, Petitioner, v. *United Technologies Corporation*, Patent Owner. IPR2017-00431. Filed Apr. 25, 2016.

Petition for Inter Parties Review of U.S. Pat. No. 8,277,174, *General Electric Company*, Petitioner v, *United Technologies Corporation*, Patent Owner: IPR2017-00999, filed Mar. 1, 2017, 71 pages.

Petition for Inter Parties Review of U.S. Pat. No. 8,337,149, *General Electric Company*, Petitioner v, *United Technologies Corporation*, Patent Owner: IPR2016-00855, filed Apr. 8, 2016, 72 pages.

Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.

(56) References Cited

OTHER PUBLICATIONS

Pratt & Whitney (2014). Evaluation of ARA catalytic hydrothermolysis (CH) fuel: Continuous lower energy, emissions an1d noise (CLEEN) program. FR-27652-2 Rev. 1. Apr. 30, 2014. pp. 1-17.
Press release. The GE90 engine. Retreived from: https://www.geaviation.com/commercial/engines/ge90-engine;https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old.
Product Brochure. Garrett TFE731. Allied Signal. Copyright 1987. pp. 1-24.
Pyrograf-III Carbon Nanofiber. Product guide. Retrieved Dec. 1, 2015 from: http://pyrografproducts.com/Merchant5/merchant.mvc?Screen=cp_nanofiber.
QCSEE ball spline pitch-change mechanism whirligig test report. (1978). NASA-CR-135354. Sep. 1, 1978. pp. 1-57.
QCSEE hamilton standard cam/harmonic drive variable pitch fan actuation system derail design report. (1976). NASA-CR-134852. Mar. 1, 1976. pp. 1-172.
QCSEE main reduction gears bearing development program final report. (1975). NASA-CR-134890. Dec. 1, 1975. pp. 1-41.
QCSEE over-the-wing final design report. (1977). NASA-CR-134848. Jun. 1, 1977. pp. 1-460.
QCSEE over-the-wing propulsion system test report vol. III—mechanical performance. (1978). NASA-CR-135325. Feb. 1, 1978. pp. 1-112.
QCSEE Preliminary analyses and design report. vol. 1. (1974). NASA-CR-134838. Oct. 1, 1974. pp. 1-337.
QCSEE preliminary analyses and design report. vol. II. (1974). NASA-CR-134839. Oct. 1, 1974. pp. 340-630.
QCSEE the aerodynamic and mechanical design of the QCSEE under-the-wing fan. (1977). NASA-CR-135009. Mar. 1, 1977. pp. 1-137.
QCSEE the aerodynamic and preliminary mechanical design of the QCSEE OTW fan. (1975). NASA-CR-134841. Feb. 1, 1975. pp. 1-74.
QCSEE under-the-wing engine composite fan blade design. (1975). NASA-CR-134840. May 1, 1975. pp. 1-51.
QCSEE under-the-wing engine composite fan blade final design test report. (1977). NASA-CR-135046. Feb. 1, 1977. pp. 1-55.
QCSEE under-the-wing engine composite fan blade preliminary design test report. (1975). NASA-CR-134846. Sep. 1, 1975. pp. 1-56.
QCSEE under-the-wing engine digital control system design report. (1978). NASA-CR-134920. Jan. 1, 1978. pp. 1-309.
Quiet clean general aviation turbofan (QCGAT) technology study final report vol. I. (1975). NASA-CR-164222. Dec. 1, 1975. pp. 1-186.
Ramsden, J.M. (Ed). (1978). The new European airliner. Flight International, 113(3590). Jan. 7, 1978. pp. 39-43.
Ratna, D. (2009). Handbook of thermoset resins. Shawbury, UK: iSmithers. pp. 187-216.
Rauch, D. (1972). Design study of an air pump and integral lift engine ALF-504 using the Lycoming 502 core. Prepare for NASA. Jul. 1972. pp. 1-182.
Read, B. (2014). Powerplant revolution. AeroSpace. May 2014. pp. 28-31.
Reshotko, M., Karchmer, A., Penko, P.F. and McArdle, J.G. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
Response to the Summons of Oral Proceedings for European Patent No. EP2949882 by Rolls-Royce, dated Oct. 9, 2019.
Response to the Summons of Oral Proceedings for European Patent No. EP2949882 by Safran, dated Oct. 9, 2019.
Response to the Summons of Oral Proceedings for European Patent No. EP3051078 by Rolls-Royce, dated Oct. 17, 2019.

Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
Riegler, C., and Bichlmaier, C. (2007). The geared turbofan technology—Opportunities, challenges and readiness status. Porceedings CEAS. Sep. 10-13, 2007. Berlin, Germany. pp. 1-12.
Rolls-Royce M45H. Jane's Aero-engines, Aero-engines—Turbofan. Feb. 24, 2010.
Rossikhin, A. A., Pankov, S.V., Khaletskiy, Y.D., and Mileshin, V.I. (2014). Computational study on acoustic features of fan model with leaned stators. Proceedings of ASME Turbo Expo 2014: Turbine Technical Conference and Exposition. Jun. 16-20, 2014. pp. 1-10.
Rossikhin, A., Pankov S., Brailko, I., and Mileshin, V. (2014). Numerical investigation of high bypass ratio fan tine noise. Proceedings of ASME Turbo Expo 2014: Turbine Technical Conference and Exposition. Jun. 16-20, 2014. pp. 1-10.
Rotordynamic instability problems in high-performance turbomachinery. (1986). NASA conference publication 2443. Jun. 2-4, 1986.
Roux, E. (2007). Turbofan and turbojet engines database handbook. Editions Elodie Roux. Blagnac: France, pp. 1-595.
Salemme, C.T. and Murphy, G.C. (1979). Metal spar/superhybrid shell composite fan blades. Prepared for NASA. NASA-CR-159594. Aug. 1979. pp. 1-127.
Sargisson, D.F. (1985). Advanced propfan engine technology (APET) and single-rotation gearbox/pitch change mechanism. NASA Contractor Report-168113. R83AEB592. Jun. 1, 1985. pp. 1-476.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.
Seader, J.D. and Henley, E.J. (1998). Separation process principles. New York, NY: John Wiley & Sons, Inc. pp. 722-726 and 764-771.
Shah, D.M. (1992). MoSi2 and other silicides as high temperature structural materials. Superalloys 1992. The Minerals, Metals, Materials Society. pp. 409-422.
Shorter Oxford English Dictionary, 6th Edition. (2007), vol. 2, N-Z, pp. 1888.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Singh, A. (2005). Application of a system level model to study the planetary load sharing behavior. Jounal of Mechanical Design. vol. 127. May 2005. pp. 469-476.
Singh, B. (1986). Small engine component technology (SECT) study. NASA CR-175079. Mar. 1, 1986. pp. 1-102.
Singh, R. and Houser, D.R. (1990). Non-linear dynamic analysis of geared systems. NASA-CR-180495. Feb. 1, 1990. pp. 1-263.
Smith, C.E., Hirschkron, R., and Warren, R.E. (1981). Propulsion system study for small transport aircraft technology (STAT). Final report. NASA-CR-165330. May 1, 1981. pp. 1-216.
Smith, L.H. Jr. (1993). NASA/GE fan and compressor research accomplishments. May 24-27, 1993. pp. 1-20.
Smith-Boyd, L. and Pike, J. (1986). Expansion of epicyclic gear dynamic analysis program. Prepared for NASA. NASA CR-179563. Aug. 1986. pp. 1-98.
Sowers, H.D. and Coward, W.E. (1978). QCSEE over-the-wing (OTW) engine acuostic design. NASA-CR-135268. Jun. 1, 1978. pp. 1-52.
Spadaccini, L.J., and Huang, H. (2002). On-line fuel deoxygenation for coke suppression. ASME, Jun. 2002. pp. 1-7.
Spadaccini, L.J., Sobel, D.R., and Huang, H. (2001). Deposit formation and mitigation in aircraft fuels. Journal of Eng. for Gas Turbine and Power, vol. 123. Oct. 2001. pp. 741-746.
Summons to Attend Oral Proceedings for European Patent Application No. EP13777804.9 dated Dec. 10, 2019.
Summons to Attend Oral Proceedings for European Patent Application No. EP13778330.4 (EP2809922) dated Dec. 2, 2019.

(56) References Cited

OTHER PUBLICATIONS

Summons to Attend Oral Proceedings for European Patent Application No. EP13822569.3 (EP2841718), dated Oct. 23, 2019, 13 pages.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Sutliff, D. (2005). Rotating rake turbofan duct mode measurement system. NASA TM-2005-213828. Oct. 1, 2005. pp. 1-34.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Sweetman, B. and Sutton, O. (1998). Pratt Whitney's surprise leap. Interavia Business & Technology, 53.621, p. 25.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds Ind. Eng. Chem., Prod. Res. Dev., vol. 17(1). 1978. pp. 86-90.
Technical Data. Teflon. WS Hampshire Inc. Retrieved from: http://catalog.wshampshire.com/Asset/psg_teflon_ptfe.pdf.
Technical Report. (1975). Quiet Clean Short-haul Experimental Engine (Qcsee) Utw fan preliminary design. NASA-CR-134842. Feb. 1, 1975. pp. 1-98.
Technical Report. (1977). Quiet Clean Short-haul Experimental Engine (QCSEE) Under-the-Wing (UTW) final design report. NASA-CR-134847. Jun. 1, 1977. pp. 1-697.
Third Party Observations for EP Application No. EP13777804.9 (EP2809940), by Rolls-Royce, dated Nov. 21, 2019, 3 pages.
Third Party Observations for EP Application No. EP18191325.2 (EP3608515) by Rolls Royce dated Mar. 10, 2020.
Third Party Observations for EP Application No. EP18191325.2 (EP3608515) by Rolls Royce dated Mar. 6, 2020.
Third Party Observations for EP Application No. EP18191333.6 (EP3467273) by Rolls Royce dated Mar. 9, 2020.
Thompson L. Gamechanger: How Pratt & Whitney transformed itself to lead a revolution in jet propulsion. Forbes. Retrieved Apr. 28, 2016 from: http://www.forbes.com/sites/lorenthompson/2016/01/21/gamechanger-how-pratt-whitney-transformed-itself-to-lead-a-revolution-in-jet-propulsion/print/.
Thulin, R.D., Howe, D.C., and Singer, I.D. (1982). Energy efficient engine: High pressure turbine detailed design report. Prepared for NASA. NASA CR-165608. Recevied Aug. 9, 1984. pp. 1-178.
Gliebe, P.R., Ho, P.Y., and Mani, R. (1995). UHB engine fan and broadband noise reduction study. NASA CR-198357. Jun. 1995. pp. 1-48.
Grace, S.M., Sondak, D.L., Dorney, D.J., and Longue, M. (2007). CFD computation of fan interaction noise. Proceedings of IMECE2007 2007 ASME International Mechanical Engineering Congress and Exposition. Nov. 11-14, 2007. pp. 1-11.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Gray, D.E. (1978). Energy efficient engine preliminary design and integration studies. NASA-CP-2036-PT-1. Nov. 1978. pp. 89-110.
Gray, D.E. (1978). Energy efficient engine preliminary design and integration studies. Prepared for NASA. NASA CR-135396. Nov. 1978. pp. 1-366.

Gray, D.E. and Gardner, W.B. (1983). Energy efficient engine program technology benefit/cost study—vol. 2. NASA CR-174766. Oct. 1983. pp. 1-118.
Greitzer, E.M., Bonnefoy, P.A., Delaroseblanco, E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794/vol. 1. pp. 1-187.
Griffiths, B. (2005). Composite fan blade containment case. Modern Machine Shop. Retrieved from: http://www.mmsonline.com/articles/composite-fan-blade-containment-case pp. 1-4.
Grose T.K. (2013). Reshaping flight for fuel efficiency: Five technologies on the runway. National Geographic. Mar. 16, 2016. Retrieved Apr. 23, 2013 from: http://news.nationalgeographic.com/news/energy/2013/04/130423-reshaping-flight-for-fuel-efficiency.html.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-CON 94. Fort Lauderdale, FL. May 1-4, 1994. pp. 1-10.
Gunston, B. (Ed.) (2000). Jane's aero-engines, Issue seven. Coulsdon, Surrey, UK: Jane's Information Group Limited. pp. 510-512.
Guynn, M. D., Berton, J.J., Fisher, K. L., Haller, W.J., Tong, M. T., and Thurman, D.R. (2009). Analysis of turbofan design options for an advanced single-aisle transport aircraft. American Institute of Aeronautics and Astronautics. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Guynn, M.D., Berton, J.J. & Haller, W.J. (2013). Advanced single-aisle transport propulsion design options revisited. AIAA 2013-4330. Aug. 12-14, 2013. p. 1-17.
Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.
Haldenbrand, R. and Norgren, W.M. (1979). Airesearch QCGAT program [quiet clean general aviation turbofan engines]. NASA-CR-159758. pp. 1-199.
Hall, C.A. and Crichton, D. (2007). Engine design studies for a silent aircraft. Journal of Turbomachinery, 129, 479-487.
Han, J., Dutta, S., and Ekkad, S.V. (2000). Gas turbine heat transfer and cooling technology. New York, NY: Taylor Francis. pp. 1-25, 129-157, and 160-249.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Hazlett, R.N. (1991). Thermal oxidation stability of aviation turbine fuels. Philadelphia, PA: ASTM. pp. 1-163.
Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.
Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.
Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.
Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.
Hendricks, E.S. and Tong, M.T. (2012). Performance and weight estimates for an advanced open rotor engine. NASA/TM-2012-217710. pp 1-13.
Hess, C. (1998). Pratt & Whitney develops geared turbofan. Flug Revue 43(7). Oct. 1998.

(56) References Cited

OTHER PUBLICATIONS

Hill, P.G. & Peterson, C.R. (2010). Mechanics and thermodynamics of propulsion, 2nd Edition. New Delhi, India: Dorling Kindersley. p. 225-6.

Hill, P.G., Peterson, C.R. (1965). Mechanics and thermodynamics of propulsion. Addison-Wesley Publishing Company, Inc. pp. 307-308.

Hill, P.G., Peterson, C.R. (1992). Mechanics and thermodynamics of propulsion, 2nd Edition. Addison-Wesley Publishing Company, Inc. pp. 400-406.

Holcombe, V. (2003). Aero-Propulsion Technology (APT) task V low noise ADP engine definition study. NASA CR-2003-212521. Oct. 1, 2003. pp. 1-73.

Honeywell Learjet 31 and 35/36 TFE731-2 to 2C Engine Upgrade Program. Sep. 2005. pp. 1-4.

Honeywell LF502. Jane's Aero-engines, Aero-engines—Turbofan. Feb. 9, 2012.

Honeywell LF502. Jane's Aero-engines, Aero-engines—Turbofan. Aug. 17, 2016.

Honeywell LF507. Jane's Aero-engines, Aero-engines—Turbofan. Feb. 9, 2012.

Honeywell Sabreliner 65 TFE731-3 to -3D Engine Upgrade Program. Oct. 2005. pp. 1-4.

Honeywell TFE731. Jane's Aero-engines, Aero-engines—Turbofan. Jul. 18, 2012.

Honeywell TFE731 Pilot Tips. pp. 1-143.

Honeywell TFE731-5AR to -5BR Engine Conversion Program. Sep. 2005. pp. 1-4.

Horikoshi, S. and Serpone, N. (2013). Introduction to nanoparticles. Microwaves in nanoparticle synthesis. Wiley-VCH Verlag GmbH Co. KGaA. pp. 1-24.

Horlock, J.H. (1958). Axial flow compressors: Fluid mechanics and thermodynamics. London: Butterworths Scientific Publications. pp. 29, 70.

Howard, D.F. (1976). QCSEE preliminary under the wing flight propulsion system analysis report. NASA CR-134868. Feb. 1, 1976. pp. 1-260.

Howe, D.C. and Wynosky, T.A. (1985). Energy efficient engine program advanced turbofan nacelle definition study. NASA CR-174942. May 1, 1985. pp. 174.

Howe, D.C., and Wynosky, T.A. (1985). Energy efficient engine program advanced turbofan nacelle definition study. NASA-CR-174942. May 1985. University of Washington dated Dec. 13, 1990. pp. 1-14.

Howe, D.C., and Wynosky, T.A. (1985). Energy efficient engine program advanced turbofan nacelle definition study. NASA-CR-174942. May 1985. pp. 1-60.

Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.

Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.

Hughes, C. (2010). Geared turbofan technology. NASA Environmentally Responsible Aviation Project. Green Aviation Summit. NASA Ames Research Center. Sep. 8-9, 2010. pp. 1-8.

Hughes, C., Jeracki, R.J., Woodward, R.P., and Miller, C.J. (2005). Fan noise source diagnostic test—Rotor alone aerodynamic performance results. NASA/TM-2005-211681. pp. 1-28.

Hughes, C.E., Podboy, G.G., Woodward, R.P., and Jeracki, R.J. (2005). The effect of bypass nozzle exit area on fan aerodynamic performance and noice in a model turbofan simulator. Proceedings of GT2005 ASME Turbo Expo 2005 Power for Land, Sea, and Air. Jun. 6-9, 2005. pp. 1-24.

2003 NASA seal/secondary air system workshop. (2003). NASA/CP-2004-212963/vol. 1. Sep. 1, 2004. pp. 1-408.

K2012). Gas Power Cycle—Jet Propulsion Technology, A case study. Machine Design Magazine. Nov. 5, 1998. Retrieved from: http://machinedesign.com/content/pw8000-0820.

About Gas Turb. Retrieved Jun. 26, 2018 from: http://gasturb.de/about-gasturb.html.

Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.

Aeronautical Engineering: A cumulative index to the 1977 issues. National Aeronautics and Space Administration. NASA SP-7037. Washington, D.C. Jan. 1978.

Aerospace Information Report. (2008). Advanced ducted propulsor in-flight thrust determination. SAE International AIR5450. Aug. 2008. p. 1-392.

Agarwal, B.D and Broutman, L.J. (1990). Analysis and performance of fiber composites, 2nd Edition. John Wiley Sons, Inc. New York: New York. pp. 1-11, 13-23, 26-33, 50-51, 56-58, 60-61, 64-71, 87-89, 324-329, 436-437.

AGMA Standard (1997). Design and selection of components for enclosed gear drives. lexandria, VA: American Gear Manufacturers Association. pp. 1-48.

AGMA Standard (1999) Flexible couplings-Mass elastic properties and other characteristics. Alexandria, VA: American Gear Manufacturers Association. pp. 1-46.

AGMA Standard (2006). Design manual for enclosed epicyclic gear drives. Alexandria, VA: American Gear Manufacturers Association. pp. 1-104.

Ahmad, F. and Mizramoghadam, A.V. (1999). Single v. two stage high pressure turbine design of modern aero engines. ASME. Prestend at the International Gast Turbine Aeroengine Congress & Exhibition. Indianapolis, Indiana. Jun. 7-10, 1999. pp. 1-9.

Amezketa, M., Iriarte, X., Ros, J., and Pintor, J. (2009). Dynamic model of a helical gear pair with backlash and angle-varying mesh stiffness. Multibody Dynamics 2009, ECCOMAS Thematic Conference. 2009. pp. 1-36.

Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.

Anderson, R.D. (1985). Advanced Propfan Engine Technology (APET) definition study, single and counter-rotation gearbox/pitch change mechanism design. NASA CR-168115. Jul. 1, 1985. pp. 1-289.

Annexe Mesures—Methodologie de mesure et de calcul. STF495M-4 and STF495M-5. Cited in: Documents cited by Rolls-Royce in anticipation of Oral Proceedings for Opposition of European Patent No. 2809932 dated Jan. 20, 2020.

Avco Lycoming Divison. ALF 502L Maintenance Manual. Apr. 1981. pp. 1-118.

Aviadvigatel D-110. Jane's Aero-engines, Aero-engines—Turbofan. Jun. 1, 2010.

Awker, R.W. (1986). Evaluation of propfan propulsion applied to general aviation. NASA CR-175020. Mar. 1, 1986. pp. 1-140.

Baker, R.W. (2000). Membrane technology and applications. New York, NY: McGraw-Hill. pp. 87-153.

Benzakein, M.J. (2001). Propulsion strategy for the 21st century—A vision into the future. pp. 1-9.

Berton, J.J. and Guynn, M.D. (2012). Multi-objective optimization of a turbofan for an advanced, single-aisle transport. NASA/TM-2012-217428. pp. 1-26.

Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.

Bloomer, H.E. and Loeffler, I.J. (1982). QCSEE over-the-wing engine acoustic data. NASA-TM-82708. May 1, 1982. pp. 1-558.

Bloomer, H.E. and Samanich, N.E. (1982). QCSEE under-the-wing engine acoustic data. NASA-TM-82691. May 1, 1982. pp 1-28.

Bloomer, H.E. and Samanich, N.E. (1982). QCSEE under-the-wing enging-wing-flap aerodynamic profile characteristics. NASA-TM-82890. Sep. 1, 1982. pp. 1-48.

Bloomer, H.E., Loeffler, I.J., Kreim, W.J., and Coats, J.W. (1981). Comparison of NASA and contractor reslts from aeroacoustic tests of QCSEE OTW engine. NASA Technical Memorandum 81761. Apr. 1, 1981. pp. 1-30.

(56) References Cited

OTHER PUBLICATIONS

Bornstein, N. (1993). Oxidation of advanced intermetallic compounds. Journal de Physique IV, 1993, 03 (C9), pp. C9-367-C9-373.
Brennan, P.J. and Kroliczek, E.J. (1979). Heat pipe design handbook. Prepared for National Aeronautics and Space Administration by B & K Engineering, Inc. Jun. 1979. pp. 1-348.
Brief Communication from Opponent after Oral Proceedings for European Patent Application No. 13743283.7 (2809932), by Safran Aircraft Engines, dated Dec. 2, 2019.
Brines, G.L. (1990). The turbofan of tomorrow. Mechanical Engineering: The Journal of the American Society of Mechanical Engineers, 108(8), 65-67.
Bucknell, R.L. (1973). Influence of fuels and lubricants on turbine engine design and performance, fuel and lubircant analyses. Final Technical Report, Mar. 1971-Mar. 1973. pp. 1-252.
Bunker, R.S. (2005). A review of shaped hole turbine film-cooling technology. Journal of Heat Transfer vol. 127. Apr. 2005. pp. 441-453.
Carney, K., Pereira, M. Revilock, and Matheny, P. (2003). Jet engine fan blade containment using two alternate geometries. 4th European LS-DYNA Users Conference. pp. 1-10.
CFM International LEAP. (n.d.) In Wikipedia. Retrieved Dec. 17, 2014 from http://en.wikipedia.org/wiki/CFM_International_LEAP.
Chapman J.W., et al., "Control Design for an Advanced Geared Turbofan Engine", AIAA Joint Propulsion Conference 2017, Jul. 10, 2017-Jul. 12, 2017, Atlanta, GA, pp. 1-12.
Cheryan, M. (1998). Ultrafiltration and microfiltration handbook. Lancaster, PA: Tecnomic Publishing Company, Inc. pp. 171-236.
Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.
Clarke, D.R. and Levi, C.G. (2003). Materials design for the next generation thermal barrier coatings. Annual. Rev. Mater. Res. vol. 33. 2003. pp. 383-417.
Cramoisi, G. Ed. (2012). Death in the Potomac: The crash of Air Florida Flight 90. Air Crash Investigations. Accident Report NTSB/AAR-82-8. p. 45-47.
Crichton, D., and Hall, T. (2007). Fan design and operation for ultra low noise. University of Cambridge Department of Engineering. Apr. 2007. pp. 1-241.
Croft, J. (2009). Integrated propulsion systems: The engine connection. Retrieved Dec. 17, 2014 from http://www.flightglobal.com/news/articles/integrated-propulsion-systems-the-engine-connection-333001/.
Cusick, M. (1981). Avco Lycoming's ALF 502 high bypass fan engine. Society of Automotive Engineers, Inc. Business Aircraft Meeting Exposition. Wichita, Kansas. Apr. 7-10, 1981. pp. 1-9.
Daggett, D.L., Brown, S.T., and Kawai, R.T. (2003). Ultra-efficient engine diameter study. NASA/CR-2003-212309. May 2003. pp. 1-52.
Dalton, III., W.N. (2003). Ultra high bypass ratio low noise engine study. NASA/CR-2003-212523. Nov. 2003. pp. 1-187.
Daly, M. Ed. (2008). Jane's Aero-Engine. Issue Twenty-three. Mar. 2008. p. 707-12.
Daly, M. Ed. (2010). Jane's Aero-Engine. Issue Twenty-seven. Mar. 2010. p. 633-636.
Damerau, J. (2014) What is the mesh stiffness of gears Screen shot of query submitted by Vahid Dabbagh, answered by Dr. Jochan Damerau, Research General Managerat Bosch Corp., Japan. Retrieved from: https://www.researchgate.net/post/What_is_the_mesh_stiffness_of_gears.
Darrah, S. (1987). Jet fuel deoxygenation. Interim Report for Period Mar. 1987-Jul. 1988. pp. 1-22.
Dassault Falcon 900EX Easy Systems Summary. Retrieved from: http://www.smartcockpit.com/docs/F900EX-Engines.pdf pp. 1-31.
Datasheet. CF6-80C2 high-bypass turbofan engines. Retreived from https://geaviation.com/sites/default/files/datasheet-CF6-80C2.pdf.
Datasheet. CFM56-5B for the Airbus A320ceo family and CFM56-7B for the Boeing 737 family. https://www.cfmaeroengines.com/.
Datasheet. Genx™ high bypass turbofan engines. Retreived from: https://www.geaviation.com/sites/default/files/datasheet-genx.pdf.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Davis, D.G.M. (1973). Variable-pitch fans: Progress in Britain. Flight International. Apr. 19, 1973. pp. 615-617.
Decision Denying Institution of Inter Partes Review, *General Electric Company*, Petitioner v. *United Technologies Corporation*, Patent Owner, IPR 2016-00855, Entered Sep. 29, 2016.
Decision for Inter Partes Review of U.S. Pat. No. 9,121,412. Claims 1, 2, 4, 5, 7, 8, and 11. *General Electric Company*, Petitioner v. *United Technologies Corporation*, Patent Owner. Entered date of Oct. 27, 2016.
Decision Institution of Inter Parties Review, *General Electric Company*, Petitioner v, *United Technologies Corporation*, Patent Owner, IPR2017-00999, U.S. Pat. No. 8,277,174, Entered Jul. 6, 2017, pp. 1-4.
Decision of the Opposition Division for European Patent No. 2811120 (14155460.0), dated Jan. 15, 2020.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Declaration of Dr. Magdy Attia, In re U.S. Pat. No. 8,313,280, Executed Oct. 21, 2016, pp. 1-88.
Declaration of Dr. Magdy Attia, In re U.S. Pat. No. 8,517,668, Executed Dec. 8, 2016, pp. 1-81.
Declaration of John Eaton, Ph.D. In re U.S. Pat. No. 8,689,568, Executed Mar. 28, 2016, pp. 1-87.
Declaration of Reza Abhari, In re U.S. Pat. No. 8,227,174, IPR2017-00999, Executed Feb. 7, 2017, pp. 1-85.
Declaration of Reza Abhari, In re U.S. Pat. No. 8,448,895, Executed Nov. 28, 2016, pp. 1-81.
Declaration of Reza Abhari. In re U.S. Pat. No. 8,695,920, claims 1-4, 7-14, 17 and 19, Executed Nov. 29, 2016, pp. 1-102.
Declaration of Reza Abhari. In re U.S. Pat. No. 8,695,920. Executed Nov. 30, 2016, pp. 1-67.
Declaration of Reza Abhari, Ph.D. In re U.S. Pat. No. 8,337,149, Executed Apr. 5, 2016, pp. 1-77.
Declaration of Reza Abhari, Ph.D. In re U.S. Pat. No. 8,844,265, Executed Jun. 28, 2016, pp. 1-91.
Declaration of Reza Abhari, Ph.D. In re U.S. Pat. No. 9,121,412, Executed Apr. 23, 2016, pp. 1-71.
Defeo, A. and Kulina, M. (1977). Quiet clean short-haul experimental engine (QCSEE) main reduction gears detailed design final report. Prepared for Nasa. NASA-CR-134872. Jul. 1977. pp. 1-157.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Digital Press Kit. Pratt Whitney PurePower Engine: This changes everything. pp. 4-6.
Dixon, S.L. (1998). Fluid mechanics, thermodynamics of turbomachinery. Oxford: Elsevier Butterworth-Heinemann. pp. 94-144.
Drago, R.J. (1974). Heavy-lift helicopter brings up drive ideas. Power Transmission Design. Mar. 1987. pp. 1-15.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Dudley, D.W., Ed. (1954). Handbook of practical gear design. Lancaster, PA: Technomic Publishing Company, Inc. pp. 3.96-102 and 8.12-18.
Dudley, D.W., Ed. (1962). Gear handbook. New York, NY: McGraw-Hill. pp. 14-17 (TOC, Preface, and Index).
Dudley, D.W., Ed. (1962). Gear handbook. New York, NY: McGraw-Hill. pp. 3.14-18 and 12.7-12.21.
Dudley, D.W., Ed. (1994). Practical gear design. New York, NY: McGraw-Hill. pp. 119-124.
Edkins, D.P., Hirschkron, R., and Lee, R. (1972). TF34 turbofan quiet engine study. Final Report prepared for NASA. NASA-CR-120914. Jan. 1, 1972. pp. 1-99.

(56) References Cited

OTHER PUBLICATIONS

Edwards, T. and Zabarnick, S. (1993). Supercritical fuel deposition mechanisms. Ind. Eng. Chem. Res. vol. 32. 1993. pp. 3117-3122.
El-Sayad, A.F. (2008). Aircraft propulsion and gas turbine engines. Boca Raton, FL: CRC Press. pp. 215-219 and 855-860.
Enoki, T. Kodama, H., Kusuda, S. (2013). Investigation of fan rotor interaction with pressure disturbance produced by downstream pylon. Proceedings of ASME Turbo Expo 2013: Trubine Technical Conference and Exposition Jun. 3-7, 2013. pp. 1-14.
Epstein, A.H. (2014). Aeropropulsion for commercial aviation in the twenty-first century and research directions needed. AiAA Journal 52(5). May 2014. pp. 901-911.
European Search Report for Application No. EP12861657 dated Sep. 3, 2014.
European Search Report for Application No. EP15166722.7 dated Sep. 2, 2015.
European Search Report for Application No. EP16154639, dated Jun. 16, 2016, 7 pages.
European Search Report for European Patent Application No. 19166650.2 completed Jul. 18, 2019.
European Search Report for European Patent Application No. 21177641.4 completed Oct. 15, 2021.
Faghri, A. (1995). Heat pipe and science technology. Washington, D.C.: Taylor Francis. pp. 1-60.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
File History for U.S. Appl. No. 12/131,876.
Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.
Flack, R. (2005). Fundamentals of jet propulsion with applications. New York: Cambridge University Press. p. 281.
Fledderjohn, K.R. (1983). The TFE731-5: Evolution of a decade of business jet service. SAE Technical Paper Series. Business Aircraft Meeting Exposition. Wichita, Kansas. Apr. 12-15, 1983. pp. 1-12.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Garret TFE731 Turbofan Engine (Cat C). Chapter 79: Lubrciation System. TTFE731 Issue 2. 2010. pp. 1-24.
Gates, D. Bombardier flies at higher market. Seattle Times. Jul. 13, 2008. pp. C6.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Ivchenko-Progress AI-727M. Jane's Aero-engines, Aero-engines—Turbofan. Nov. 27, 2011.
Ivchenko-Progress D-436. Jane's Aero-engines, Aero-engines—Turbofan. Feb. 8, 2012.
Ivchenko-Progress D-727. Jane's Aero-engines, Aero-engines—Turbofan. Feb. 7, 2007.
Jacobson, N.S. (1993). Corrosion of silicon-based ceramics in combustion environments. J. Am. Ceram. Soc. 76 (1). pp. 3-28.
Jeng, Y.-L., Lavernia, E.J. (1994). Processing of molybdenum disilicide. J. of Mat. Sci. vol. 29. 1994. pp. 2557-2571.
Johnson, I.A. and Bullock, R.O. Ed. (1965). Aerodynamic design of axial-flow compressors. pp. 1-505.
Johnston, R.P. and Hemsworth, M.C. (1978). Energy efficient engine preliminary design and integration studies. Jun. 1, 1978. pp. 1-28.
Johnston, R.P., Hirschkron, R., Koch, C.C., Neitzel, R.E., and Vinson, P.W. (1978). Energy efficient engine: Preliminary design and integration study- final report. NASA CR-135444. Sep. 1978. pp. 1-401.
Jorgensen, P.J., Wadsworth, M.E., and Cutler, I.B. (1961). Effects of water vapor on oxidation of silicon carbide. J. Am. Ceram. Soc. 44(6). pp. 248-261.
Judgement and Final Written Decision. U.S. Pat. No. 8,448,895, *General Electric Company,* Petitioner, v. *United Technologies Corporation,* Patent Owner, IPR2017-00425, Entered Jul. 2, 2018, 52 pages.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Kandebo, S.W. (1998). Geared-Turbofan engine design targets cost, complexity. Aviation Week Space Technology, 148(8). p. 34-5.
Kandebo, S.W. (1998). Pratt & Whitney launches geared turbofan engine. Aviation Week Space Technology, 148(8). p. 32-4.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Kerrebrock, J.L. (1977). Aircraft engines and gas turbines. Cambridge, MA: The MIT Press, p. 11.
Kestner, B.K., Schutte, U.S., Gladin, J.C., and Mavris, D.N. (2011). Ultra high bypass ration engine sizing and cycle selection study for a subsonic commercial aircraft in the N+2 timeframe. Proceedings of ASME Turbo Expo 2011. Jun. 6-10, 2011. pp. 1-11.
Kjelgaard, C. (2010). Gear up for the GTF. Aircraft Technology, 105. Apr.-May 2010. pp. 86, 88, 90, 92-95.
Knip, Jr., G. (1987). Analysis of an advanced technology subsonic turbofan incorporating revolutionary materials. NASA Technical Memorandum. May 1987. pp. 1-23.
Kollar, L.P. and Springer, G.S. (2003). Mechanics of composite structures. Cambridge, UK: Cambridge University Press, p. 465.
Kovich, G. and Steinke, R.J. (1976). Peformance of low-pressure-ratio low-tip-speed fan stage with blade tip solidity of 0.65. NASA TM X-3341. Feb. 1976. pp. 1-95.
Krantz, T.L. (1990). Experimental and analytical evaluation of efficiency of helicopter planetary stage. NASA Technical Paper. Nov. 1990. pp. 1-19.
Krauskopf, L. & Shumaker, L. (2014). GE exec says avoided geared design in jet engine battle with Pratt. Reuters. Sep. 15, 2014. http://www.reuters.com/article/us-general-electric-united-tech-engine-idUSKBN0HA2H620140915.
Kurzke, J. (2001). GasTurb 9: A program to calculate design and off-design performance of gas turbines. Retrieved from: https://www.scribd.com/document/92384867/GasTurb9Manual.
Kurzke, J. (2008). Preliminary Design, Aero-engine design: From state of the art turbofans towards innovative architectures. pp. 1-72.
Kurzke, J. (2009). Fundamental differences between conventional and geared turbofans. Proceedings of ASME Turbo Expo: Power for Land, Sea, and Air 2009, Orlando, Florida. pp. 145-153.
Kurzke, J. (2012). GasTurb 12: Design and off-design performance of gas turbines. Retrieved from: https://www.scribd.com/document/153900429/GasTurb-12.
Larsson L., Gronstedt, T., and Kyprianidis, K.G. (2011). Conceptual design and mission analysis for a geared turbofan and an open rotor configuration. Proceedings of ASME turbo expo 2011. Jun. 6-10, 2011. pp. 1-12.
Leckie, F.A. and Dal Bello, D.J. (2009). Strength and stiffness of engineering systems. Mechanical Engineering Series. Springer. pp. 1-10, 48-51.
Lee, K.N. (2000). Current status of environmental barrier coatings for Si-Based ceramics. Surface and Coatings Technology 133-134, 2000. pp. 1-7.
Levintan, R.M. (1975). Q-Fan demonstrator engine. Journal of Aircraft. vol. 12( 8). Aug. 1975. pp. 658-663.

(56) References Cited

OTHER PUBLICATIONS

Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
Liebeck, R.H., Andrastek, D.A., Chau, J., Girvin, R., Lyon, R., Rawdon, B.K., Scott, P.W et al. (1995). Advanced subsonic airplane design economics studies. NASA CR-195443. Apr. 1995. pp. 1-187.
Litt, J.S. (2018). Sixth NASA Glenn Research Center propulsion control and diagnostics (PCD) workshop. NASA/CP-2018-219891. Apr. 1, 2018. pp. 1-400.
Lord, W.K., MacMartin, D.G., and Tillman, T.G. (2000). Flow control opportunities in gas turbine engines. American Institute of Aeronautics and Astronautics. pp. 1-15.
Lynwander, P. (1983). Gear drive systems: Design and application. New York, New York: Marcel Dekker, Inc. pp. 145, 355-358.
Macisaac, B. and Langston, R. (2011). Gas turbine propulsion systems. Chichester, West Sussex: John Wiley Sons, Ltd. pp. 260-265.
Mancuso, J.R. and Corcoran, J.P. (2003). What are the differences in high performance flexible couplings for turbomachinery Proceedings of the Thirty-Second Turbomachinery Symposium. 2003. pp. 189-207.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Mattingly, J.D. (1996). Elements of gas turbine propulsion. New York, New York: McGraw-Hill, Inc. pp. 1-18, 60-62, 223-234, 462-479, 517-520, 757-767, and 862-864.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 673-675, 682-685, 697-699, 703-705, 802-805, 862-864, and 923-925.
Mattingly, J.D. (1996). Elements of gas turbine propulsion. New York, New York: McGraw-Hill, Inc. pp. 299-305.
Mattingly, J.D. (1996). Elements of gas turbine propulsion. New York, New York: McGraw-Hill, Inc. pp. 8-15.
Mattingly, J.D. (2006). Elements of propulsion gas turbines and rockets. . New York, New York: AAIA Education Series. p. 419.
Mattingly, J.D., Heiser, W.H., and Pratt, D.T. (2002). Aircraft engine design. Second Ed. Education Series. Reston, VA. pp. 1-687.
Mavris, D.N., Schutte, U.S. (2016). Application of deterministic and probabilistic system design methods and enhancements of conceptual design tools for ERA project final report. NASA/CR-2016-219201. May 1, 2016. pp. 1-240.
McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.
McCracken, R.C. (1979). Quiet short-haul research aircraft familiarization document. NASA-TM-81149. Nov. 1, 1979. pp. 1-76.
Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.
Translation of European Opposition against European Patent Application No. EP2776677 held by United Technologies Corporation. Mailed Mar. 23, 2016.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.

Tsang D. (2011). Special report: The engine battle heats up (Update 1) Aspire Aviation. Retrieved Apr. 3, 2016 from: http://www.aspireaviation.com/2011/05/10/pw-purepower-engine-vs-cfm-leap-x/.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Tsuchiya, N., Nakamura, Y., Goto, S., and Kodama, H. (2004). Low noise FEGV designed by numerical method based on CFD. Proceedings of ASME Turbo Expo 2004 Power for Land, Sea, and Air. Jun. 14-17, 2004. pp. 1-8.
Tummers, B. (2006). DataThief III. Retreived from: https://datathief.org/DatathiefManual.pdf pp. 1-52.
Turbomeca Aubisque. Jane's Aero-engines, Aero-engines—Turbofan. Nov. 2, 2009.
Turner, M. G., Norris, A., and Veres, J.P. (2004). High-fidelity three-dimensional simulation of the GE90. Nasa/ TM-2004-212981. pp. 1-18.
Type Certificate Data Sheet No. E6NE. Department of Transportation Federal Aviation Administration. Jun. 7, 2002. pp. 1-10.
U.S. Department of Transportation: Federal Aviation Administration Advisory Circular, Runway overrun prevention, dated: Nov. 6, 2007, p. 1-8 and Appendix 1 pp. 1-15, Appendix 2 pp. 1-6, Appendix 3 pp. 1-3, and Appendix 4 pp. 1-5.
U.S. Department of Transportation: Federal Aviation Administration Advisory Circular. Standard operating procedures for flight deck crewmembers, Dated: Feb. 27, 2003, p. 1-6 and Appendices.
U.S. Department of Transportation: Federal Aviation Administration Type Certificate Data Sheet No. E6WE. Dated: May 9, 2000. p. 1-9.
Vasudevan, A.K. and Petrovic, J.J. (1992). A comparative overview of molybedenum disilicide composites. Materials Science and Engineering, A155, 1992. pp. 1-17.
Warwick, G. (2007). Civil engines: Pratt & Whitney gears up for the future with GTF. Flight International, Nov. 2007. Retrieved Jun. 14, 2016 from: https://www.flightglobal.com/news/articles/civil-engines-pratt-amp-whitney-gears-up-for-the-future-with-219989/.
Waters, M.H. and Schairer, E.T. (1977). Analysis of turbofan propulsion system weight and dimensions. NASA Technical Memorandum. Jan. 1977. pp. 1-65.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Wendus, B.E., Stark, D.F., Holler, R.P., and Funkhouse, M.E. (2003). Follow-on technology requirement study for advanced subsonic transport. Technical Report prepared for Nasa. NASA/CR-2003-212467. Aug. 1, 2003. pp. 1-47.
Whitaker, R. (1982). ALF 502: plugging the turbofan gap. Flight International, p. 237-241, Jan. 30, 1982.
Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.
Wikipedia. Stiffness. Retrieved Jun. 28, 2018 from: https://en.wikipedia.org/wiki/Stiffness.
Wikipedia. Torsion spring. Retreived Jun. 29, 2018 from: https://en.wikipedia.org/wiki/Torsion_spring.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Willis, W.S. (1979). Quiet clean short-haul experimental engine (QCSEE) final report. NASA/CR-159473 pp. 1-289.
Winn, A. (Ed). (1990). Wide Chord Fan Club. Flight International, 4217(137). May 23-29, 1990. pp. 34-38.
Woodward, R.P., Bock, L.A., Heidelberg, L., and Hall, D.G. (1992). Far-field noise and internal modes from a ducted propeller at simulated aircraft takeoff conditions. NASA TM 105369. Jan. 6-9, 1992. pp. 1-15.

(56) References Cited

OTHER PUBLICATIONS

Wright, G.H. and Russell, J.G. (1990). The M.45SD-02 variable pitch geared fan engine demonstrator test and evaluation experience. Aeronautical Journal., vol. 84(836). Sep. 1980. pp. 268-277.

Xie, M. (2008). Intelligent engine systems: Smart case system. NASA/CR-2008-215233. pp. 1-31.

Xu, L. & Gronstedt, T. (2010). Design analysis of an intercooled turbofan engine. Journal of Engineering for Gas Turbine Engines and Power vol. 132. Nov. 2010. pp. 114503-1-114503-4.

Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.

Zalud, T. (1998). Gears put a new spin on turbofan performance. Machine Design, 70(20), p. 104.

Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.

Zhao, J.C. and Westbrook, J.H. (2003). Ultrahigh-temperature materials for jet engines. MRS Bulletin. vol. 28(9). Sep. 2003. pp. 622-630.

\* cited by examiner

|  | | BLOCKER DOOR POSITION | |
|---|---|---|---|
|  |  | OPEN | CLOSE |
| BYPASS PORT | OPEN | M1 | M2 |
| | CLOSE | M3 | M4 |

FIG.12

SPLITTER AND GUIDE VANE ARRANGEMENT FOR GAS TURBINE ENGINES

CROSS-REFERENCE TO RELATED APPLICATIONS

This application is a continuation of U.S. patent application Ser. No. 16/891,492, filed Jun. 3, 2020, the disclosure of which is incorporated by reference in its entirety herein.

BACKGROUND

This disclosure relates generally to flow distribution for gas turbine engines, and more particularly to arranging guide vanes relative to one or more flow splitters.

Gas turbine engines can include a fan section, a compressor section, a combustor section and a turbine section. The fan section includes a fan having fan blades for compressing a portion of incoming air to produce thrust and also for delivering a portion of air to the compressor section. Air entering the compressor section is compressed and delivered into the combustor section where it is mixed with fuel and ignited to generate a high-speed exhaust gas flow. The high-speed exhaust gas flow expands through the turbine section to drive the compressor section and the fan.

Some fan sections may include guide vanes positioned in a bypass flow path downstream of the fan blades and a flow splitter. The guide vanes may direct the bypass airflow from the fan blades before being ejected from the bypass flow path.

SUMMARY

A section for a gas turbine engine according to an example of the present disclosure includes a rotor including a row of blades extending in a radial direction outwardly from a hub. The hub is rotatable about a longitudinal axis such that the row of blades deliver flow to a bypass flow path, an intermediate flow path, and a core flow path. A first case surrounds the row of blades to establish the bypass flow path. A first flow splitter divides flow between the bypass flow path and a second duct. A row of guide vanes extends in the radial direction across the bypass flow path. A second flow splitter radially inboard of the first flow splitter divides flow from the second duct between the intermediate flow path and the core flow path. A forwardmost edge of the second flow splitter is axially aft of a forwardmost edge of the first flow splitter with respect to the longitudinal axis, and the forwardmost edges of the first and second flow splitters are axially forward of the row of guide vanes with respect to the longitudinal axis. A bypass port interconnects the intermediate and bypass flow paths at a position axially aft of a position of the row of guide vanes relative to the longitudinal axis.

In a further embodiment of any of the foregoing embodiments, the hub is driven by a turbine through a geared architecture.

In a further embodiment of any of the foregoing embodiments, each of the blades extends in the radial direction between a 0% span position at the hub and a 100% span position at a tip to establish a hub-to-tip ratio, and the hub-to-tip ratio is less than or equal to 0.4 measured relative to a forwardmost portion of a leading edge of the blades.

In a further embodiment of any of the foregoing embodiments, a pressure ratio across the blades alone is less than 1.45 at cruise at 0.8 Mach and 35,000 feet.

A further embodiment of any of the foregoing embodiments includes a first duct and a second duct. The first duct establishes the bypass flow path. The second duct branches between the intermediate and core flow paths at the second flow splitter. A first annulus area is established by the first duct at the forwardmost edge of the first flow splitter. A second annulus area is established by the second duct at the forwardmost edge of the first flow splitter. A bypass area ratio is defined as the first annulus area divided by the second annulus area, and the bypass area ratio is greater than or equal to 10.

In a further embodiment of any of the foregoing embodiments, each of the blades extends in the radial direction between a 0% span position at the hub and a 100% span position at a tip. The forwardmost edge of the first flow splitter is situated in the radial direction at a first splitter position. The first splitter position is radially aligned with or radially inward of a 25% span position of the blades. The forwardmost edge of the second flow splitter is situated in the radial direction at a second splitter position, and the second splitter position is radially aligned with or radially outward of a 5% span position of the blades.

In a further embodiment of any of the foregoing embodiments, each of the blades extends in the radial direction between the 0% span position and the 100% span position to establish a hub-to-tip ratio, and the hub-to-tip ratio is between 0.16-0.36. The hub-to-tip ratio measured relative to a forwardmost portion of a leading edge of the blades.

In a further embodiment of any of the foregoing embodiments, the leading edges of the blades at the 100% span position is established along a first reference plane, and leading edges of the guide vanes at a 100% span position are established along a second reference plane. The first and second reference planes are perpendicular to the longitudinal axis. A first axial length is established between the first and second reference planes. A tip radius of the blades is established between the tip and the longitudinal axis, and a ratio of the first axial length divided by the tip radius is greater than or equal to 0.5.

In a further embodiment of any of the foregoing embodiments, the row of blades establishes a blade quantity (BQ), the blade quantity (BQ) is at least 12 but not more than 20 blades, the row of guide vanes establishes a vane quantity (VQ), and the vane quantity (VQ) is at least 20 but not more than 40 guide vanes.

In a further embodiment of any of the foregoing embodiments, the ratio of VQ/BQ is between 2.0 and 2.6.

In a further embodiment of any of the foregoing embodiments, the first splitter position radially is aligned with or radially outward of a 10% span position of the blades, and the second splitter position is radially aligned with or radially inward of a 15% span position of the blades. A second axial length is established between the first and second splitter positions relative to the longitudinal axis, and a ratio of the second axial length divided by the first axial length is between 0.1 and 0.3.

A gas turbine engine according to an example of the present disclosure includes a fan section including a fan having a row of blades extending in a radial direction between a 0% span position at a hub and a 100% span position at a tip. The hub is rotatable about an engine longitudinal axis such that the row of blades deliver flow to a bypass flow path, an intermediate flow path and a core flow path. A compressor section establishes the core flow path. A turbine section drives the fan section and the compressor section. A fan case includes a bypass duct surrounding the row of blades to establish the bypass flow path. A housing includes a first flow splitter that divides flow between the bypass flow path and a second duct. A row of guide vanes in the bypass duct extend in the radial direction across the bypass flow path. An engine case includes a second flow splitter radially inboard of the first flow splitter and divides flow from the second duct between the intermediate flow path and the core flow path. A bypass port interconnects the intermediate and bypass flow paths at a position downstream of the row of guide vanes. Each of the blades extends in the radial direction between the 0% span position and 100% span position to establish a hub-to-tip ratio, and the hub-to-tip ratio is less than or equal to measured relative to a forwardmost portion of a leading edge of the blades.

In a further embodiment of any of the foregoing embodiments, the turbine section includes a fan drive turbine, and a geared architecture drives the fan at a different speed than a speed of the fan drive turbine.

In a further embodiment of any of the foregoing embodiments, a pressure ratio across the blades alone is less than 1.45 at cruise at 0.8 Mach and 35,000 feet.

In a further embodiment of any of the foregoing embodiments, a forwardmost edge of the second flow splitter is axially aft of a forwardmost edge of the first flow splitter with respect to the engine longitudinal axis, and the forwardmost edges of the first and second flow splitters are axially forward of the row of guide vanes with respect to the engine longitudinal axis.

A further embodiment of any of the foregoing embodiments includes one or more blocker doors situated in the intermediate flow path downstream of the bypass port. The one or more blocker doors are moveable to selectively communicate flow in the intermediate flow path to a vent port.

A further embodiment of any of the foregoing embodiments includes a thrust reverser including a cascade that selectively communicates airflow from the bypass duct. The cascade extends axially aft of both the row of guide vanes and the bypass port with respect to the engine longitudinal axis.

A method of operation for a gas turbine engine according to an example of the present disclosure includes driving a rotor having a hub and a row of blades to deliver airflow to a bypass flow path, and an intermediate flow path and a core flow path. A first duct surrounds the row of blades to establish the bypass flow path. A first flow splitter divides airflow between the bypass flow path and the intermediate flow path. A row of guide vanes extend across the bypass flow path. A second flow splitter divides airflow between the intermediate flow path and the core flow path. The method includes communicating the airflow through a bypass port that interconnects the intermediate flow path to the bypass flow path at a position downstream of the row of guide vanes. Each of the blades extends in a radial direction between a 0% span position at the hub and a 100% span position at a tip to establish a hub-to-tip ratio, and the hub-to-tip ratio is less than or equal to 0.4 measured relative to a forwardmost portion of a leading edge of the blades.

In a further embodiment of any of the foregoing embodiments, the method includes selectively moving one or more blocker doors to communicate airflow in the intermediate flow path to a vent port, the vent port established downstream of the bypass port.

In a further embodiment of any of the foregoing embodiments, the driving step including driving the rotor through a geared architecture at a different speed than a turbine, the hub-to-tip ratio is between 0.16-0.36, a pressure ratio across the blades alone is less than 1.45 at cruise at 0.8 Mach and 35,000 feet, and a first annulus area is established at the forwardmost edge of the first flow splitter. A second annulus area is established at the forwardmost edge of the first flow splitter. A bypass area ratio is defined as the first annulus area divided by the second annulus area, and the bypass area ratio is greater than or equal to 10.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 12 illustrates exemplary engine modes.

Like reference numbers and designations in the various drawings indicate like elements.

DETAILED DESCRIPTION

Figure 1:
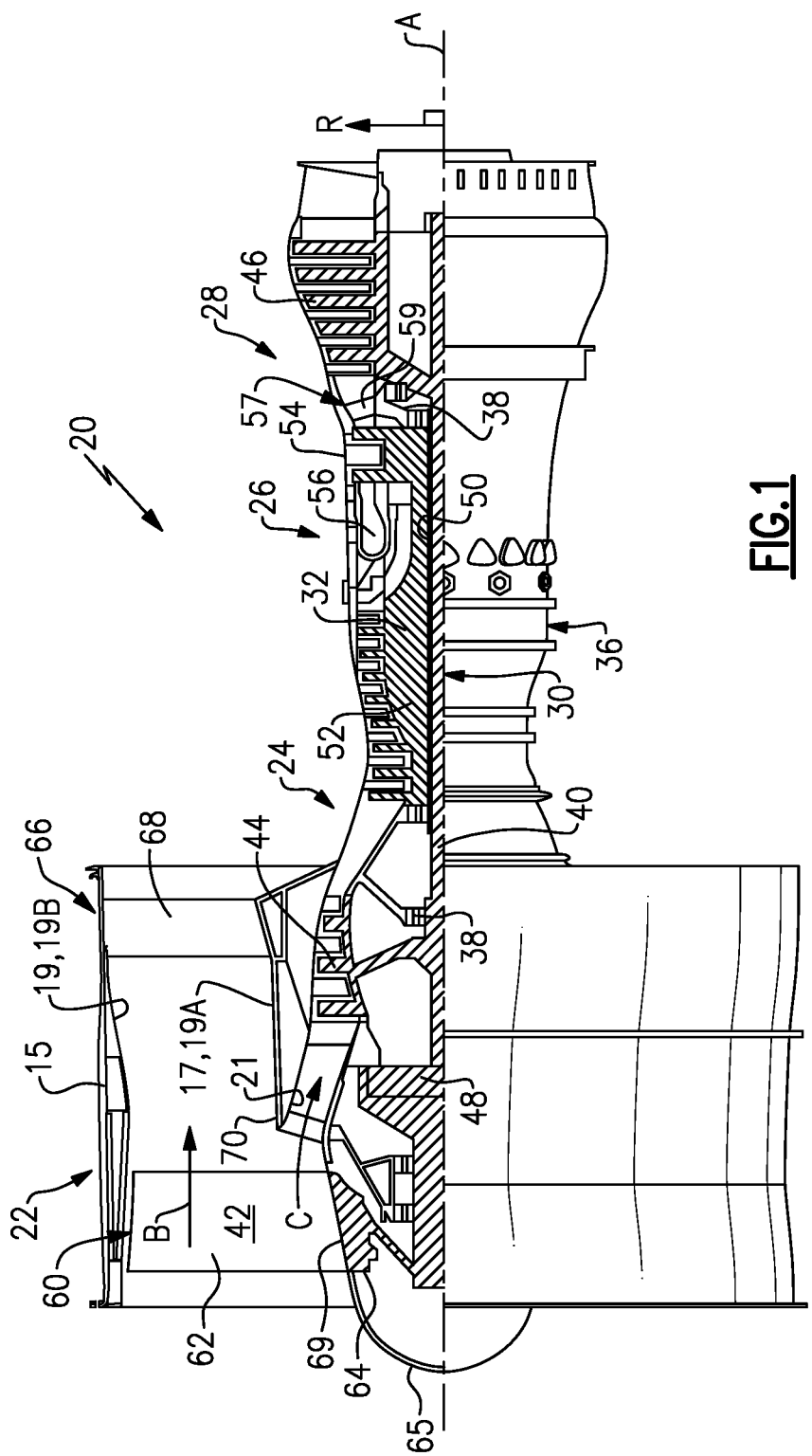
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption —also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ °\ R)/(518.7° \ R)]^{0.5}$. The "Low corrected fan tip speed" as disclosed herein according to one non-limiting embodiment is less than about 1150 ft/second (350.5 meters/second).

The fan 42 includes at least one row 60 of airfoils or blades 62 that are circumferentially distributed about, and are supported by, a rotatable hub 64. The row 60 of blades 62 can extend in a generally spanwise or radial direction R outwardly from the hub 64. The radial direction R can be perpendicular to the engine axis A. The hub 64 is rotatable in a clockwise or counter-clockwise direction RR (FIG. 4) about the engine axis A such that the blades 62 deliver airflow to the bypass flow path B and core flow path C in operation. In the illustrative example of FIG. 1, the hub 64 is driven by the low pressure (or fan drive) turbine 46 through the geared architecture 48. A spinner or nosecone 65 is supported relative to the hub 64 to provide an aerodynamic inner flow path into the fan section 22.

The fan section 22 includes at least one row 66 of turning or fan exit guide vanes 68. The guide vanes 68 are positioned in the bypass flow path B axially aft of the row 60 of blades 62 relative to the engine axis A. The row 66 of guide vanes 68 extend in the radial direction R across the bypass flow path B between the fan (e.g., first) case 15 and a core engine (e.g., second case) 17. The fan case 15 includes a bypass (e.g., first) duct 19 surrounding the row 60 of blades 62 and the row 66 of guide vanes 68 to establish the bypass flow path B. The engine case 17 is dimensioned to extend about and along the engine axis A to at least partially surround and house the compressors 44, 52, combustor 56 and turbines 46, 54. The fan case 15 and engine case 17 establish a portion of the engine static structure 36.

The engine case 17 includes a flow splitter 70 situated downstream and axially aft of the row 60 of blades 62 relative to the engine axis A. The flow splitter 70 can have a generally V-shaped cross sectional geometry and is arranged to divide airflow communicated from the row 60 of blades 62 between the bypass flow path B and a second duct 21 establishing the core flow path C. The second duct 21 can serve as an entrance or inlet to the compressor section 24 and is bounded by the flow splitter 70.

Figure 2A:
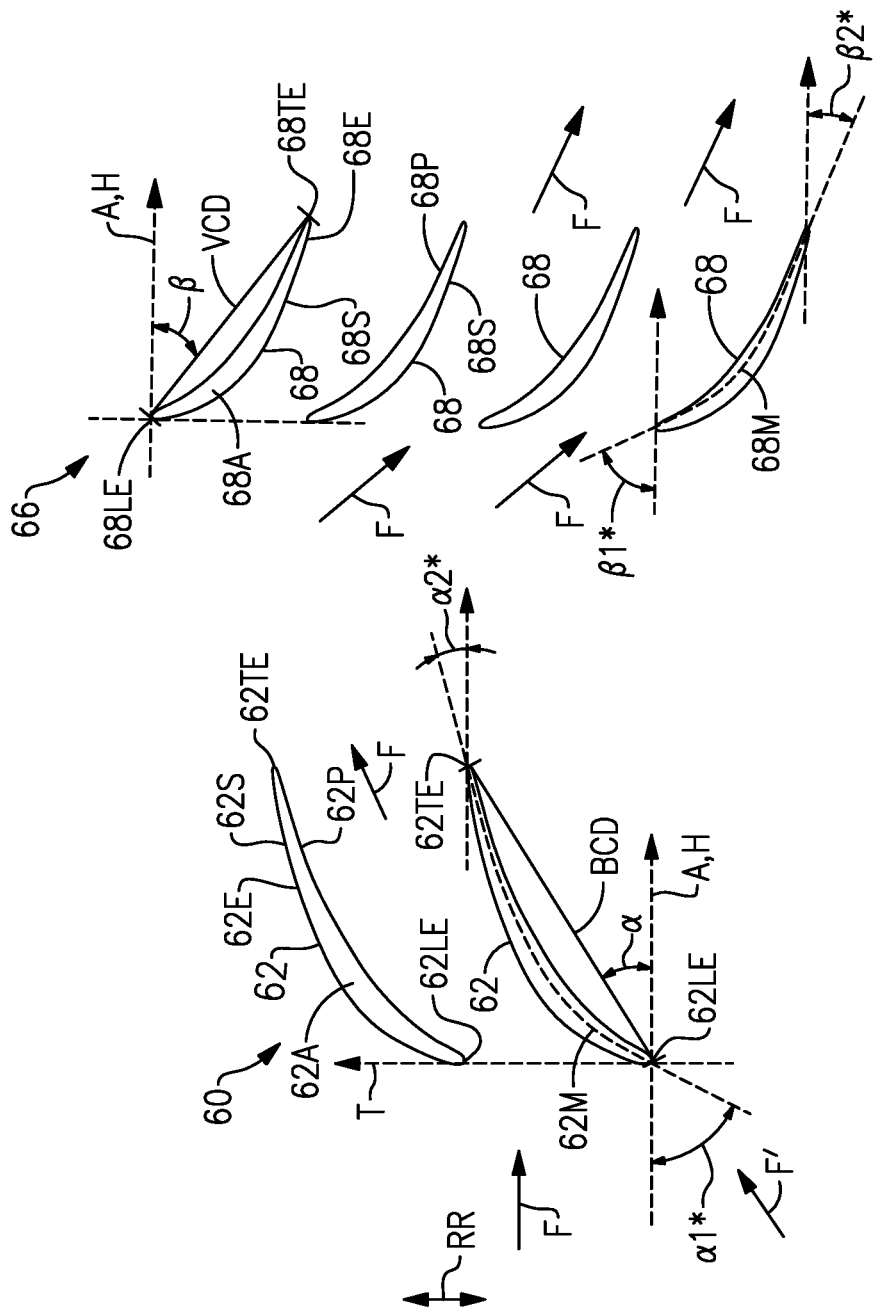
FIG. 2A illustrates an example arrangement of blades and guide vanes at a span position.
Figure 2B:
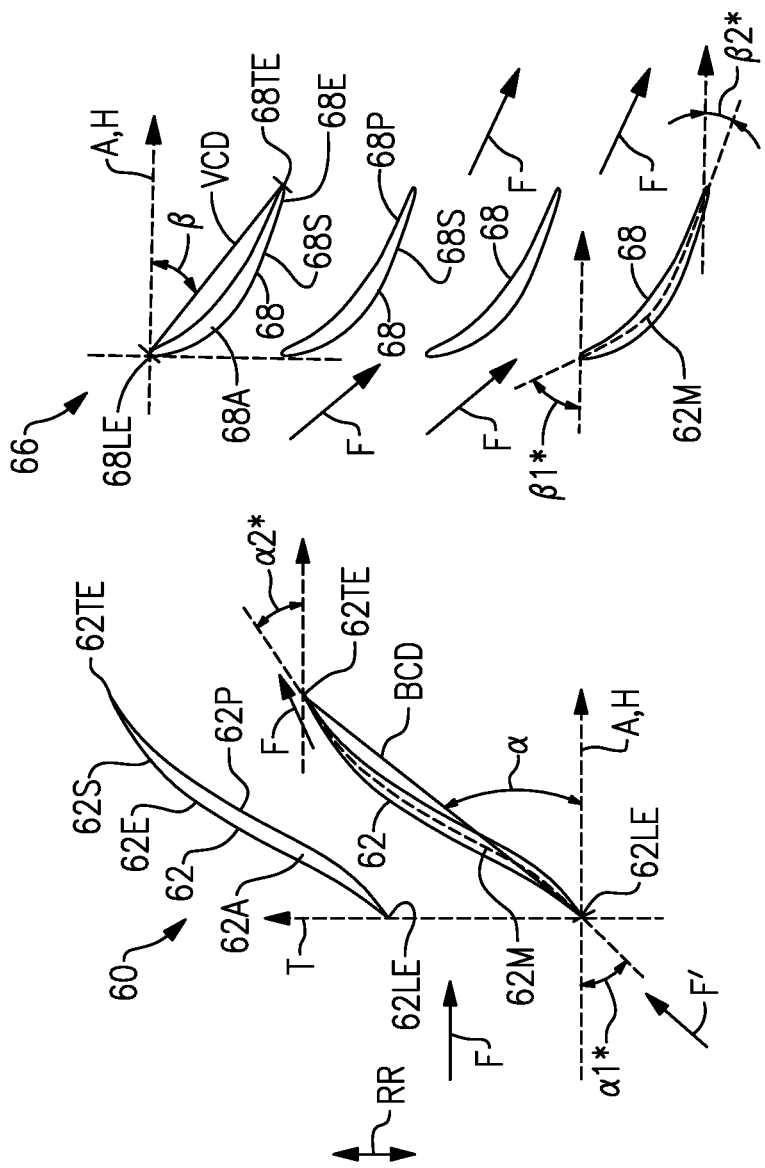
FIG. 2B illustrates an example arrangement of blades and guide vanes at another span position.
Figure 3:
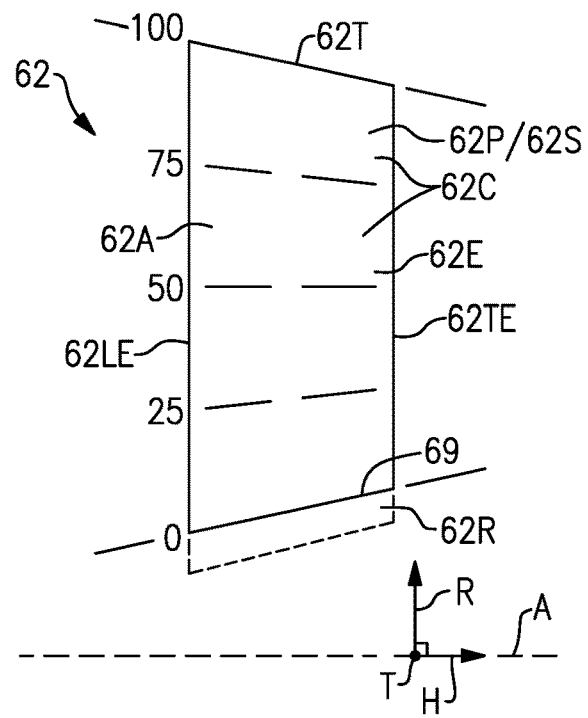
FIG. 3 is a schematic view of airfoil span positions for a blade.

Referring to FIGS. 2-3, with continuing reference to FIG. 1, each of the blades 62 includes an airfoil body 62A that extends in the radial direction R from the hub 64 (FIG. 1) between a root 62R coupled to the hub 64 and a tip 62T. Each airfoil body 62A extends axially in an axial or chordwise direction H between a leading edge 62LE and a trailing edge 62TE, and extends circumferentially in a thickness or circumferential direction T between a pressure side 62P and a suction side 62S. The directions R, H, T are perpendicular to each other. The chordwise direction H can be substantially parallel or transverse to the engine axis A. The radial direction R can have a major component that extends generally from or toward an axis of rotation of the blades 62, which in the illustrated example coincides with the engine axis A. It should be understood that the radial direction R can include a minor component in the axial and/or circumferential directions H, T such that the blades 62 have a predefined amount of sweep and/or lean, for example.

The airfoil body 62A has an exterior airfoil surface 62E providing a contour that extends in the chordwise direction H between the leading and trailing edges 62LE, 62TE. The exterior airfoil surface 62E generates lift based upon its geometry and directs flow along the core flow path C and bypass flow path B. Each blade 62 can be constructed from a composite material, a metallic material such as steel, an aluminum or titanium alloy, or a combination of one or more of these. Abrasion-resistant coatings or other protective coatings may be applied to the blade 62.

Figure 4:
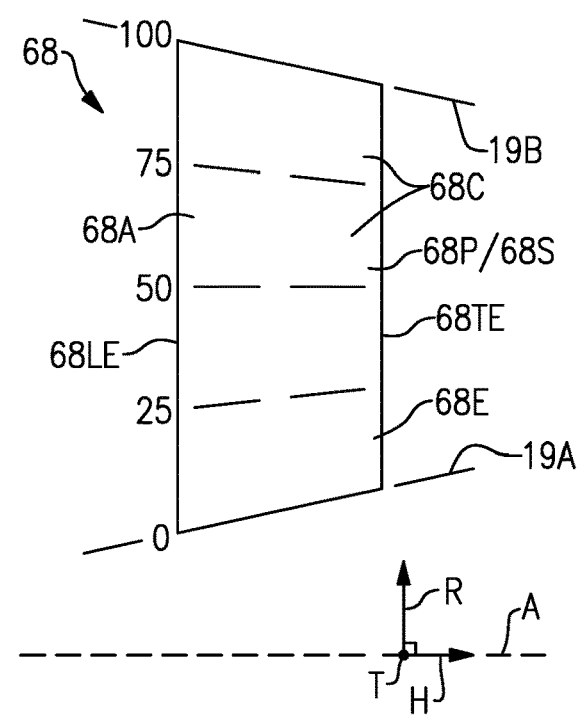
FIG. 4 is a schematic view of airfoil span positions for a guide vane.

Referring to FIGS. 2 and 4, with continuing reference to FIGS. 1 and 3, each of the guide vanes 68 includes an airfoil body 68A that extends in the radial direction R between inner and outer surfaces 19A, 19B of the duct 19, axially in the chordwise direction H between a leading edge 68LE and a trailing edge 68TE, and circumferentially in the thickness direction T between a pressure side 68P and a suction side 68S. The inner surfaces 19A of the first duct 19 can be provided by the engine case 17 at a location downstream of the flow splitter as illustrated in FIG. 1.

The airfoil body 68A has an exterior airfoil surface 68E providing a contour that extends in the chordwise direction H between the leading and trailing edges 68LE, 68TE. The exterior airfoil surface 68E can be contoured to direct airflow F (FIGS. 2A, 2B) compressed by the blades 62 through a gas path such as the bypass flow path B. The guide vanes 68 can be constructed from a composite material, a metallic material such as steel, an aluminum or titanium alloy, or a combination of one or more of these. The guide vanes 68 can serve as a structural component to transfer loads between the fan case 15 and the engine case 17 or another portion of the engine static structure 36. The fan section 22 of FIG. 1 includes a single stage fan 42 having only one row 60 of blades 62 and only one row 66 of guide vanes 68. In other examples, the fan section 22 has more than one row of blades 62 and/or guide vanes 68 configured with respect to any of the quantities disclosed herein.

FIGS. 3-4 schematically illustrate span positions of a blade 62 and guide vane 68, respectively. Span positions are schematically illustrated from 0% to 100% in 25% increments, for example, to define a plurality of sections 62C of the blade 62 and a plurality of sections 68C of the guide vane 68. Each section 62C, 68C at a given span position is provided by a conical cut that corresponds to the shape of segments of the respective gas path, such as the bypass flowpath B or core flow path C, as shown by the large dashed lines.

In the case of a blade 62 with an integral platform, the 0% span position (or zero span) corresponds to the generally radially innermost location where airfoil body 62A meets the fillet joining the airfoil body 62A to an adjacent platform 69 (see also FIG. 1). In the case of a blade 62 without an integral platform, the 0% span position corresponds to the generally radially innermost location where the discrete platform 69 meets the exterior blade surface 62E of the airfoil body 62A. A 100% span position (or full span) corresponds to a section 62C of the blade 62 at the tip 62T. The 50% position (or midspan) corresponds to a generally radial position halfway between the 0% and 100% span positions.

The 0% span position of the vane 68 can correspond to the generally radially innermost location where the exterior surface 68E of the airfoil body 68A meets the inner surfaces 19A of the duct 19. The 100% span position can correspond to the generally radially outermost location where the exterior surface 68E of the airfoil body 68A meets the outer surfaces 19B of the duct 19. The 50% span position (or midspan) corresponds to a generally radial position halfway between the 0% and 100% span positions. As illustrated in FIGS. 2A and 2B, each blade 62 is sectioned at a first generally radial position between the root 62R and the tip 62T, and each vane 68 is sectioned at a second generally radial position between the inner and outer surfaces 19A, 19B of the duct 19. The first and second radial positions can be the same (e.g., both at 25%, 50% or 100% span) or can differ (e.g., one at 50% and the other at 100% span).

Airfoil geometric shapes, stacking offsets, chord profiles, stagger angles, axial sweep and dihedral angles, tangential lean angles, bow, and/or other three-dimensional geometries, among other associated features, can be incorporated individually or collectively into the blades 62 and/or guide vanes 68 to improve various characteristics such as aerodynamic efficiency, structural integrity, and vibration mitigation.

Referring to FIG. 2A, the blades 62 and guide vanes 68 can be arranged at various orientations relative to the engine axis A. Each blade 62 establishes a chord dimension BCD. Each vane 68 establishes a chord dimension VCD. The chord dimension BCD/VCD is a length between the respective leading and trailing edges 62LE/68LE, 62TE/68TE. The chord dimension BCD/VCD may vary along the span of the airfoil body 62A/68A. The chord BCD/VCD forms a respective stagger angle $\alpha/\beta$ relative to the chordwise direction H or a plane parallel to the engine axis A.

The stagger angles $\alpha$, $\beta$ can vary along the airfoil span to define a twist. For example, the blades 62 and guide vanes 68 in FIG. 2A may be at a first span position, such as at 0% span, and the blades 62 and guide vanes 68 in FIG. 2B may be at a second, different span position, such as at 100% span. Referring to FIG. 2B, the stagger angle $\alpha$ of the blades 62 is larger at 100% span than the stagger angle $\alpha$ of the blades 62 corresponding to the span position of FIG. 2A. In examples, the stagger angle $\alpha$ of the blade 62 is greater than or equal to about 5 degrees at 0% span, or more narrowly less than or equal to about 40 degrees, such as between about 10 and 30 degrees at 0% span. In examples, the stagger angle $\alpha$ is less than or equal to about 70 degrees at 100% span, or more narrowly less than or equal to about 60 degrees, such as between about 30 and 50 degrees at 100% span.

The stagger angle $\beta$ of the vane 68 can be substantially the same from 0% span to 100% span or can differ. In examples, the stagger angle $\beta$ is greater than or equal about 10 degrees at 0% span, or more narrowly less than or equal to about 60 degrees, such as between about 20 and 40 degrees at 0% span. In examples, the stagger angle $\beta$ is less than or equal about degrees at 100% span, or more narrowly less than or equal to about 60 degrees, such as between about 30 and 50 degrees at 100% span.

Each of the blades 62 can be cambered. A mean camber line 62M bisects the airfoil body 62A between the leading and trailing edges 62LE, 62TE of the blade 62. A leading edge metal angle $\alpha 1^*$ at the leading edge 62LE and a trailing edge metal angle $\alpha 2^*$ at the trailing edge 62TE are established with respect to the mean camber line 62M and the chordwise direction H. The tip 62T of the blade 62 can rotate at a relatively faster speed, and the stagger of the blade 62 can be aligned with a relative flow direction F' to achieve an optimum incidence of the flow F relative to the leading edge metal angle α1* of the blade 62. A camber κ1 of the blade 62 is equal to a difference between the leading edge metal angle α1* and the trailing edge metal angle α2*. In the illustrative example of FIGS. 2A-2B, the camber κ1 of the blade 62 can be substantially less at 100% span (FIG. 2B) than the camber κ1 of the blade 62 at less than 100% span (FIG. 2A). The camber κ1 of the airfoil body 62A contour that extends in the chordwise direction H between the leading and trailing edges 62LE, 62TE of the blade 62 can be less than or equal to about 80 degrees at 0% span, or more narrowly less than or equal to about 70 degrees, such as between about 40 and 60 degrees at 0% span. The camber κ1 can be greater than or equal to about 5 degrees at 100% span, or more narrowly less than or equal to about 50 degrees, such as between about 10 and 40 degrees at 100% span.

Each of the vanes 68 can be cambered. A mean camber line 68M bisects the airfoil body 68A between the leading and trailing edges 68LE, 68TE of the vane 68. A leading edge metal angle β1* at the leading edge 68LE and a trailing edge metal angle β2* at the trailing edge 68TE are established with respect to the mean camber line 68M and the chordwise direction H. A camber κ2 of the vane 68 is equal to a difference between the leading edge metal angle β1* and the trailing edge metal angle β2*. The camber κ2 of the airfoil body 68A contour that extends in the chordwise direction H between the leading and trailing edges 68LE, 68TE of the vane 68 can be greater than or equal to about 5 degrees at 0% span, or more narrowly less than or equal to about 50 degrees, such as between about 10 and 40 degrees at 0% span. The camber κ2 can be less than or equal to about 80 degrees at 100% span, or more narrowly less than or equal to about 70 degrees, such as between about 40 and 60 degrees at 100% span. For the purposes of this disclosure, the terms "about" and "approximately" mean±3% of the stated value unless otherwise indicated.

Figure 5:
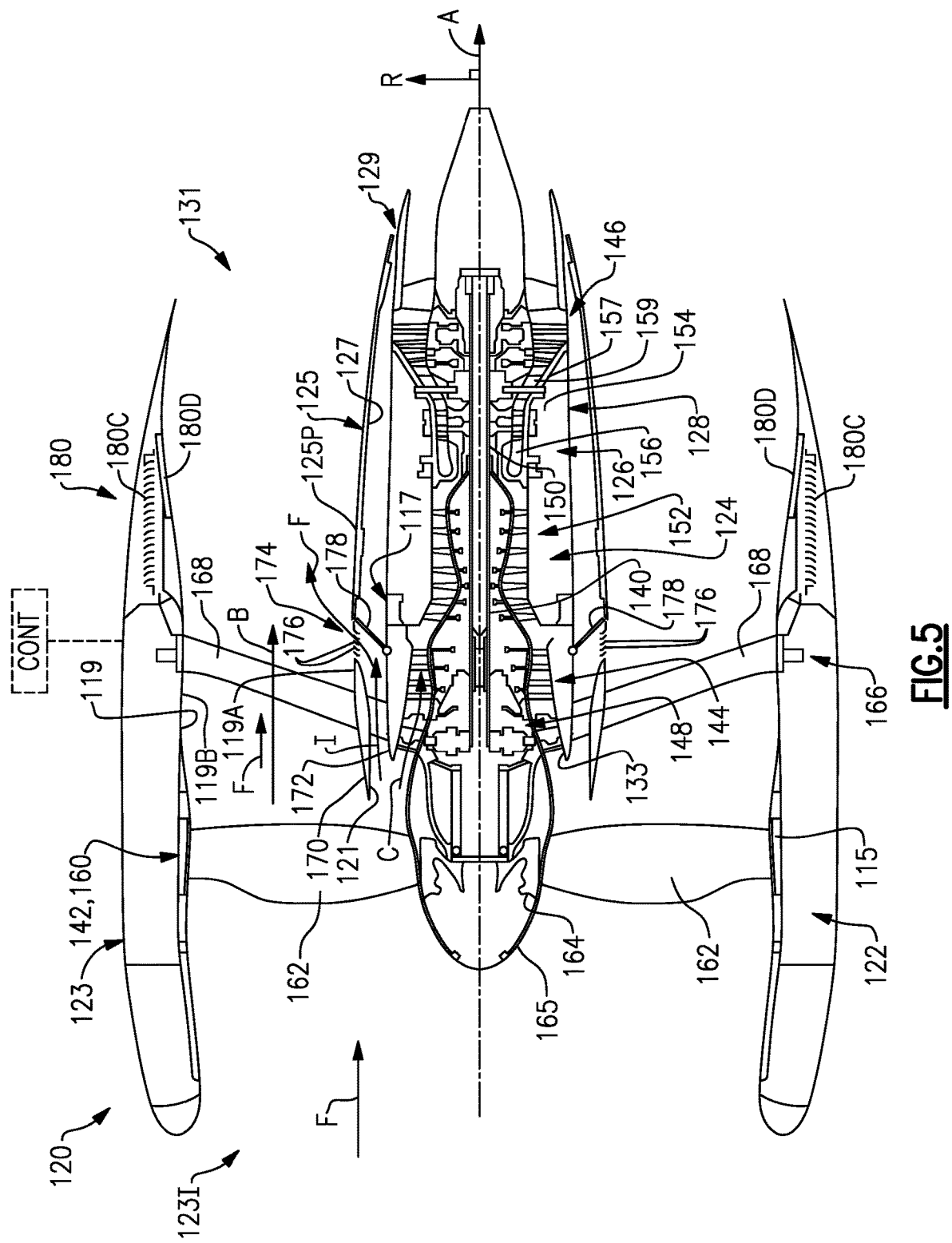
FIG. 5 illustrates a gas turbine engine according to another example including blocker doors in a closed position.

FIG. 5 illustrates a gas turbine engine 120 according to another example. In this disclosure, like reference numerals designate like elements where appropriate and reference numerals with the addition of one-hundred or multiples thereof designate modified elements that are understood to incorporate the same features and benefits of the corresponding original elements. The engine 120 includes a fan section 122 including a fan (or rotor) 142, a compressor section 124, a combustor section 126 and a turbine section 128. The compressor, combustor and turbine sections 124, 126, 128 establish respective portions of the core flow path C. The turbine section 128 drives the fan section 122 and the compressor section 124. The compressor section 124 includes a low pressure compressor 144 and a high pressure compressor 152. The turbine section 128 includes a low pressure (or fan drive) turbine 146 and a high pressure turbine 154.

The fan 142 includes at least one row 160 of blades 162 carried by and mounted to a rotatable hub 164. In examples, the blades 162 are incorporated into a fixed-pitch arrangement in which the blades 162 have a fixed stagger angle α. In other examples, the blades 162 are incorporated into a variable-pitch arrangement in which the stagger angle α varies in response to rotation of the blades 162 about a respective blade axis that extends between the blade root 162R and tip 162T.

The engine 120 can include a geared architecture 148 that drives the fan 142 at a different speed than a speed of the fan drive turbine 146 in operation. In examples, the geared architecture 148 is an epicyclic gear system such as a planetary gear system having a fixed ring gear and a rotatable carrier, or such as a star gear system having a fixed carrier and a rotatable ring gear. The geared architecture 48 can establish a gear reduction ratio of greater than about 2.3 or 2.6, or more narrowly less than about 4.0 or 5.0, for example. In other examples, the geared architecture 148 is omitted such that the fan drive turbine 146 directly drives the fan 142 at a common speed and in a common direction.

The fan section 122 includes a fan (e.g., first) case 115 including a bypass (e.g., first) duct 119 surrounding the row 160 of blades 162 to establish a bypass (e.g., first) flow path B. The engine 120 includes an engine (e.g., second) case 117 that establishes a core (e.g., second) flow path C.

The engine 120 can include a nacelle 123 and core cowling (or housing) 125. The nacelle 123 is mechanically attached or otherwise secured to the fan case 115 and establishes an engine inlet 123I. The engine inlet 123I conveys airflow F to the fan 142 in operation. The core cowling 125 is mechanically attached or otherwise secured to the engine case 117. The core cowling 125 at least partially surrounds the engine case 117. The bypass flow path B terminates at a bypass exit (or nozzle) 131 established by a trailing edge of the nacelle 123.

At least one row 166 of turning or fan exit guide vanes 168 are situated in the bypass duct 119. The guide vanes 168 extend in a radial direction R across the bypass flow path B. Each guide vane 168 extends in the radial direction R between a 0% span position along an inner surface 119A and a 100% span position along an outer surface 119B of the bypass duct 119.

Figure 8A:
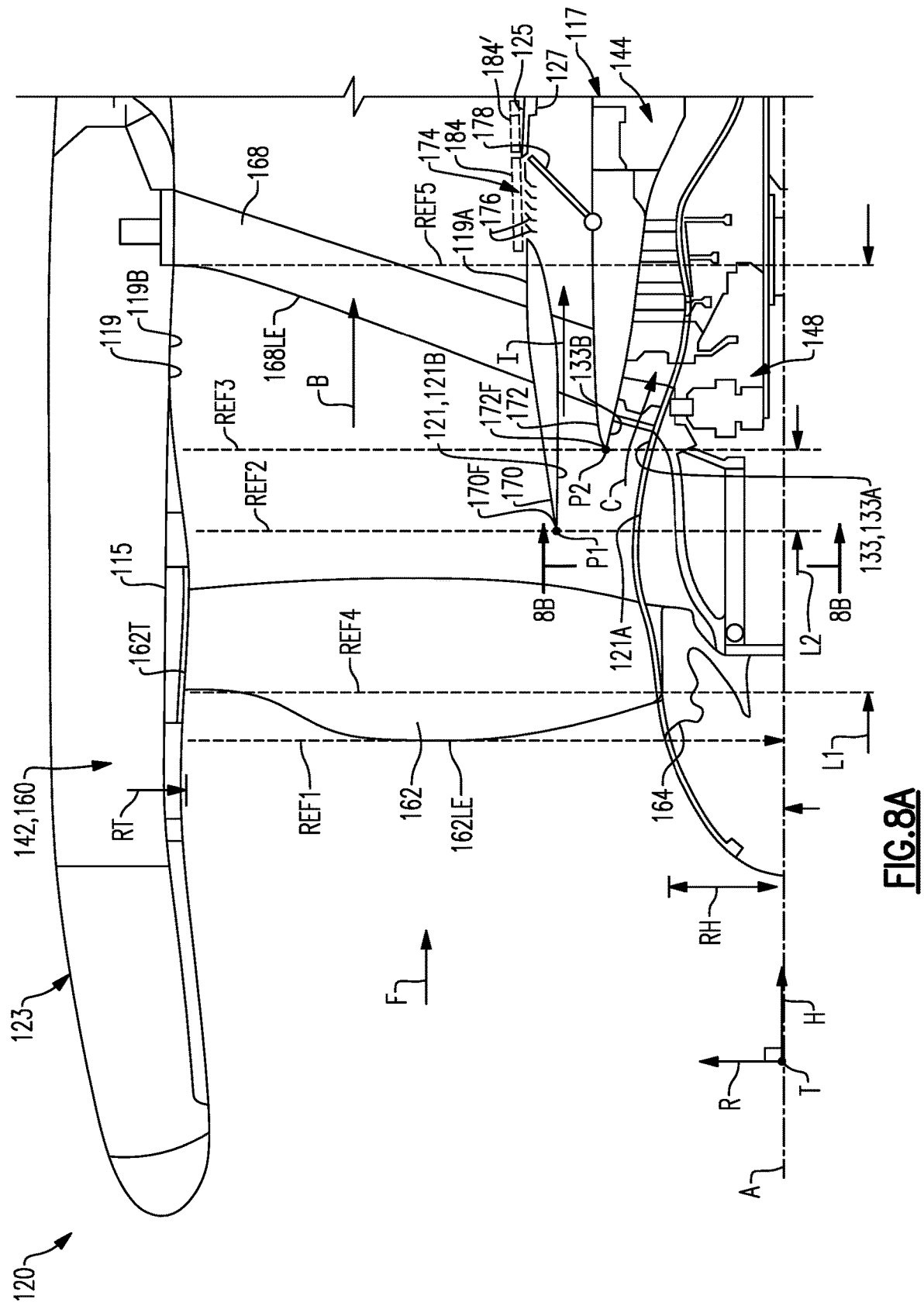
FIG. 8A illustrates a section of the engine of FIG. 5.
Figure 8B:
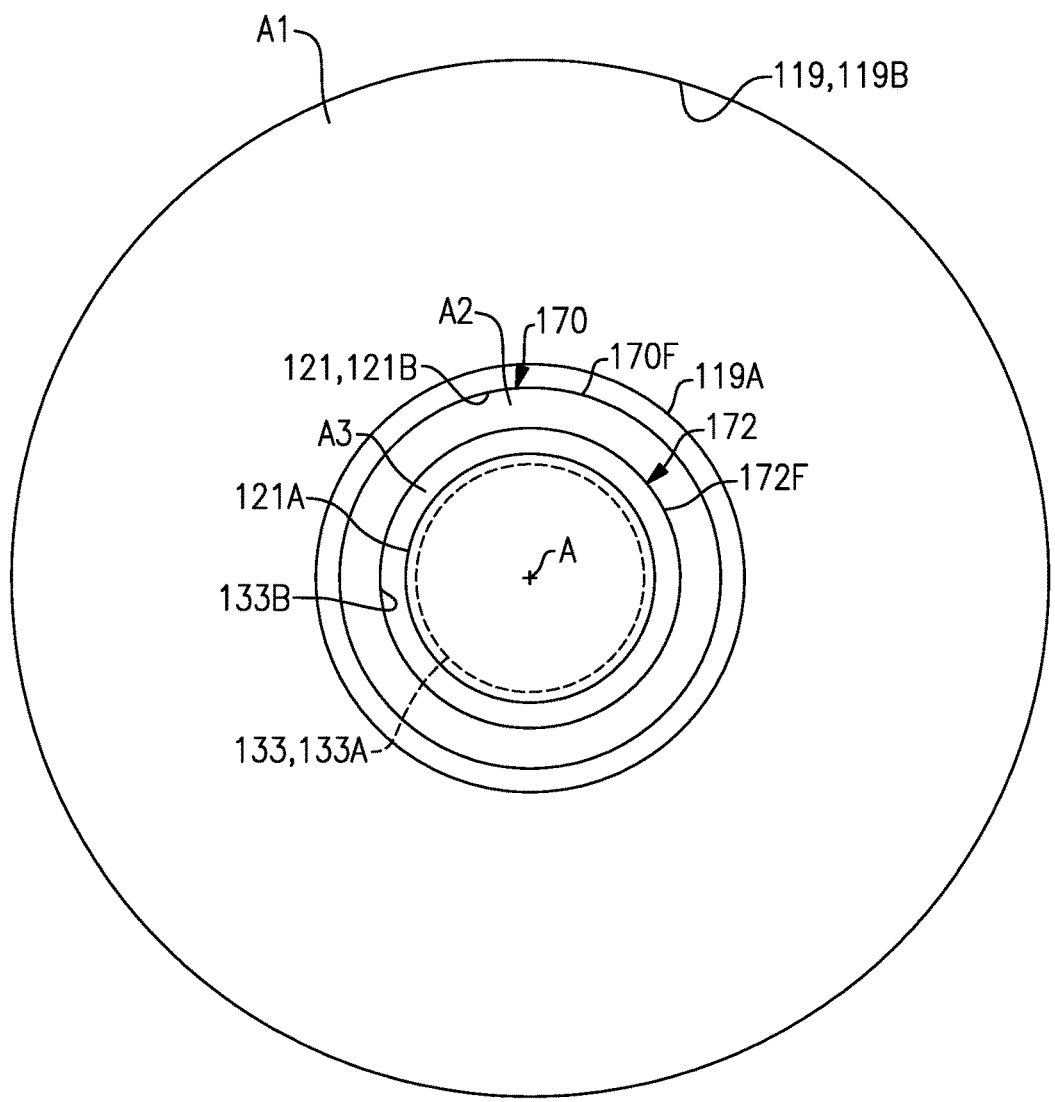
FIG. 8B illustrates a sectional view taken along line 8B-8B of FIG. 8A.
Figure 8C:
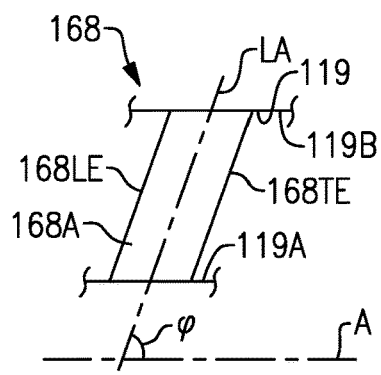
FIG. 8C illustrates an exemplary guide vane.

An airfoil body 168A of the guide vane 168 extends along a longitudinal axis LA, as illustrated in FIG. 8C. A projection of the longitudinal axis LA intersects the engine axis A to establish a vane angle φ. The vane angle φ can be approximately 90 degrees such that the guide vane is substantially perpendicular to the engine axis A, as illustrated by the guide vane 68 of FIG. 1. In examples, the vane angle φ is less 90 degrees such that the guide vane has a component that extends aftwards in the axial direction from 0% to 100% span with respect to the engine axis A, as illustrated by the guide vane 168 of FIG. 8A. The vane angle φ can be greater than or equal to 15 degrees, or more narrowly between 30 and 60 degrees, for example.

Various quantities of blades 162 and guide vanes 168 can be incorporated into the engine 120. The row 160 of blades 162 establishes a blade quantity (BQ). The row 166 of guide vanes 168 establishes a vane quantity (VQ), which can be the same or can differ from the blade quantity (BQ). The blade quantity (BQ) can be less than 24 or 26 blades, or more narrowly at least 12 but not more than 20 blades, such as 14 or 16 blades, for example. The vane quantity (VQ) can be no more than 40 guide vanes, or more narrowly at least 20 guide vanes, for example. In examples, the ratio of VQ/BQ is between 2.0 and 2.6, or more narrowly between 2.2 and 2.5, which may reduce noise due to flow interaction between the blades 162 and guide vanes 168. For the purposes of this disclosure, the term "between" is inclusive of the stated value(s) unless otherwise stated.

Various stage counts can be incorporated in the compressors 144, 152 and turbines 146, 154. For example, the low pressure compressor 144 can include at least 3 but no more than 5 compressor stages, such as 3 compressor stages as illustrated by FIGS. 1 and 5. In examples, the low pressure turbine 146 includes at least 3 but no more than 6 turbine stages, such as 3 turbine stages as illustrated by FIG. 5, 4 turbine stages, or 5 turbine stages as illustrated by FIG. 1. The high pressure turbine 154 can include a single stage, or can include two stages as illustrated by FIGS. 1 and 5, for example. A ratio between the blade quantity (BQ) and a quantity of the stages of the low pressure turbine 146 can be between about 3.3 and about 8.6, or more narrowly less than or equal to about 4.0, such as about 3.5. The example low pressure turbine 146 provides the driving power to rotate the fan 142 and therefore the relationship between the number of turbine stages of the low pressure turbine 146 and the blade quantity (BQ) disclose an example gas turbine engine 120 with increased power transfer efficiency.

The engine 120 includes a core bypass (or third) duct 127 established between the engine case 117 and core cowling 125. The core bypass duct 127 establishes an intermediate (or third) flow path I. The core bypass duct 127 can be a separate and distinct structure or can be established by a volume of the core engine bay between the engine core and core cowling 125. The core bypass duct 127 can be coupled to an annular core vent port (or nozzle) 129 established along an outer periphery of the core cowling 125. In the illustrated example of FIG. 5, the guide vanes 168 are an axially aftmost row of fan exit guide vanes in the bypass flow path B between the row 160 of blades 162 and the bypass exit 131 relative to the engine axis A. In other examples, one or more rows of vanes are arranged in the bypass flow path B axially forward and/or aft of the row 166 of guide vanes 168. The hub 164 is rotatable about the engine axis A such that the row 160 of blades 162 deliver or convey airflow to the bypass, intermediate and core flow paths B, I, C in operation.

The engine 120 includes a first flow splitter 170 and a second flow splitter 172 arranged in a cascade. The flow splitters 170, 172 are situated downstream and axially aft of the row 160 of blades 162 relative to the engine axis A. The first flow splitter 170 can be incorporated into or mechanically attached to the core cowling 125. The second flow splitter 172 can be incorporated into or mechanically attached to the engine case 117. The first flow splitter 170 establishes a portion of the bypass duct 119 and a portion of the second duct 121. The second flow splitter 172 establishes a portion of the second duct 121 and a portion of an entrance (e.g., fourth) duct 133. The entrance duct 133 can establish an entrance or inlet to the compressor section 124.

The first flow splitter 170 is arranged to divide airflow conveyed by the row 160 of blades 162 between the bypass flow path B and the second duct 121. The second flow splitter 172 is radially inboard of the first flow splitter 170 relative to the engine axis A. The second duct 121 branches between the core flow path C and the intermediate flow path I at the second flow splitter 172. The second flow splitter 172 is arranged to divide airflow conveyed to the second duct 121 between the intermediate flow path I and the core flow path C along the entrance duct 133. The flow splitters 170, 172 can have a generally V-shaped cross sectional geometry dimensioned to divide the airflow.

A bypass port 174 is established along an outer periphery 125P of the core cowling 125. The bypass port 174 interconnects the intermediate flow path I and bypass flow path B at a position downstream of the row 166 of guide vanes 168 relative to a general direction of airflow through the bypass flow path B such that airflow conveyed by the intermediate flow path I through the bypass port 174 bypasses or otherwise is not communicated across the guide vanes 168 in operation. The bypass port 174 can interconnect the intermediate flow path I and bypass flow path B at a position axially aft of the 0% span position of the row 166 of guide vanes 168 relative to the engine axis A. In the illustrated example of FIG. 5, the vent port 129 is established downstream and axially aft of both the bypass port 174 and the bypass exit 131 relative to the engine axis A. In other examples, the vent port 129 is established upstream and axially forward of the bypass exit 131 such that airflow in the bypass flow path B mixes in the bypass duct 119 with airflow conveyed by the vent port 129 prior to exiting the bypass exit 131.

One or more louvers 176 can be situated in the bypass port 174. The louvers 176 can have a generally airfoil-shaped cross sectional geometry and are arranged to direct airflow from the intermediate flow path I into the bypass flow path B in a direction generally downstream of the guide vanes 168 and toward the bypass exit 131.

The engine 120 can establish an adaptive fan flow arrangement in which a relative distribution of airflow conveyed by the fan 142 to the flow paths B, I and/or C varies during one or more modes. One or more blocker doors 184 can be moved between opened and closed positions to selectively communicate airflow through the bypass port 174 (open and closed positions indicated in dashed lines at 184, 184' of FIG. 8A for illustrative purposes).

Figure 6:
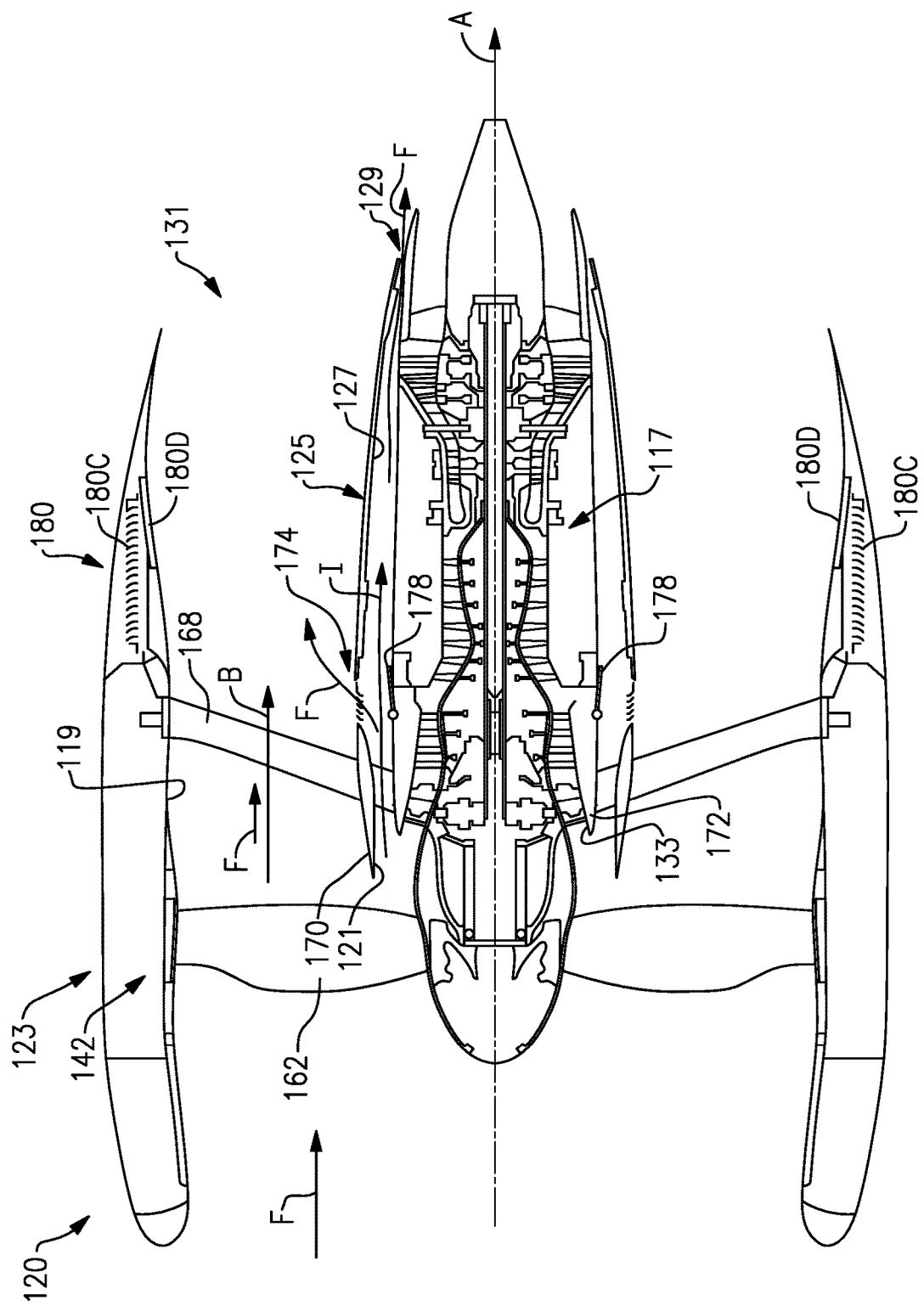
FIG. 6 illustrates the blocker doors of FIG. 5 in an opened position.

In the illustrative example of FIG. 6, the engine 120 includes one or more blocker doors 178 situated in the core bypass duct 127 to modulate airflow through the intermediate flow path I. The blocker doors 178 are situated in the intermediate flow path I downstream of the bypass port 174. The blocker doors 178 are moveable between a closed position (FIG. 5) and an open position (FIG. 6) to selectively communicate airflow in the intermediate flow path I downstream to the vent port 129. The blocker doors 178 at least partially or substantially block airflow through the intermediate flow path I in the closed position. In the illustrative example of FIGS. 5-6, the blocker doors 178 are pivotable flaps having a pivot point established along the core bypass duct 127. It should be understood that other arrangements can be utilized to selectively communicate airflow downstream to the vent port 129.

Figure 7A:
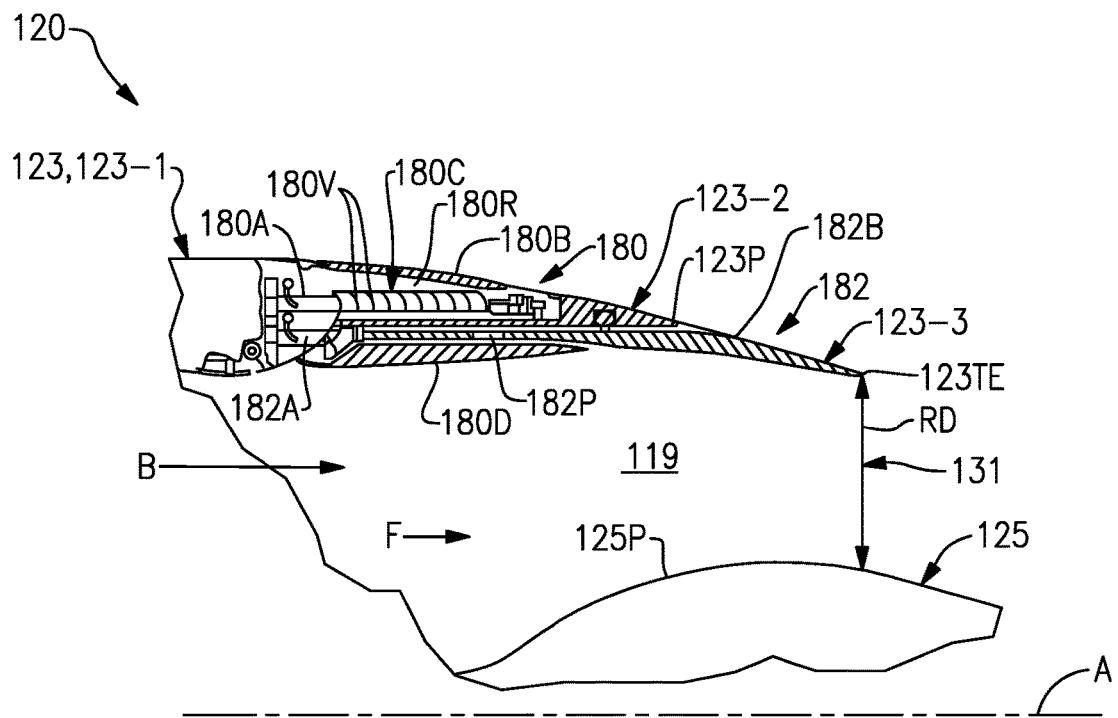
FIG. 7A is a partial cross section view of a thrust reverser and a variable area nozzle in stowed positions.
Figure 7B:
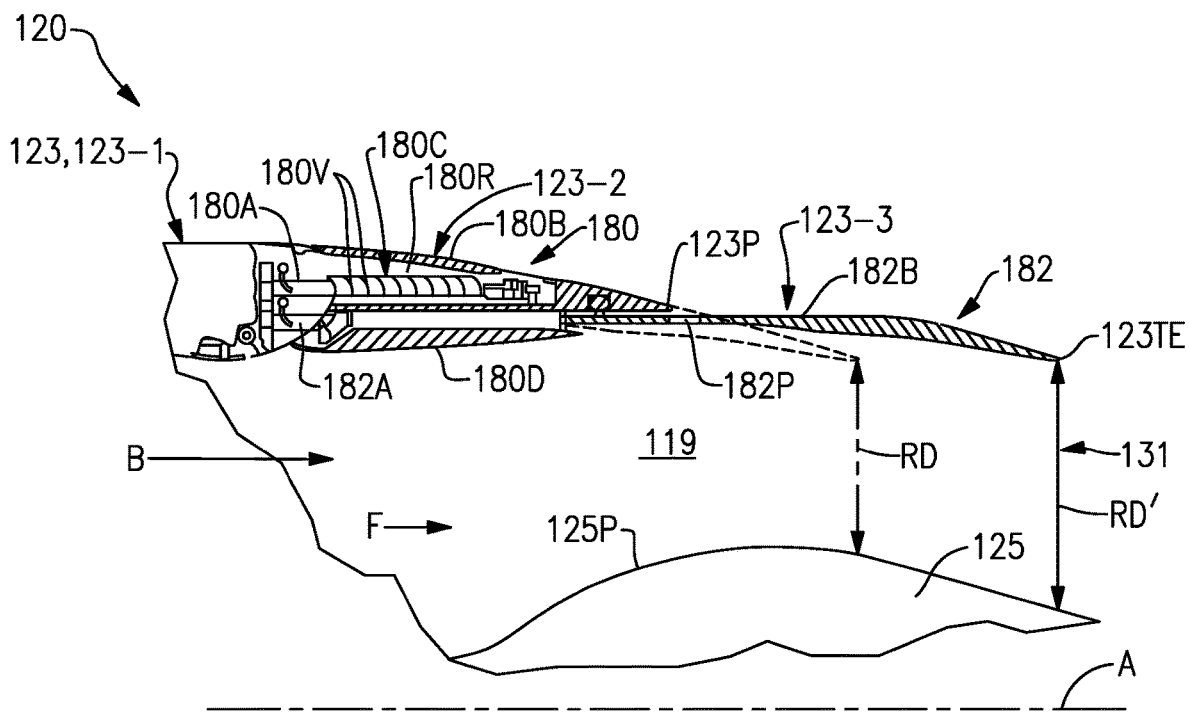
FIG. 7B is a partial cross section view of the thrust reverser of FIG. 7A in the stowed position and the variable area nozzle of FIG. 7A in a deployed position.
Figure 7C:
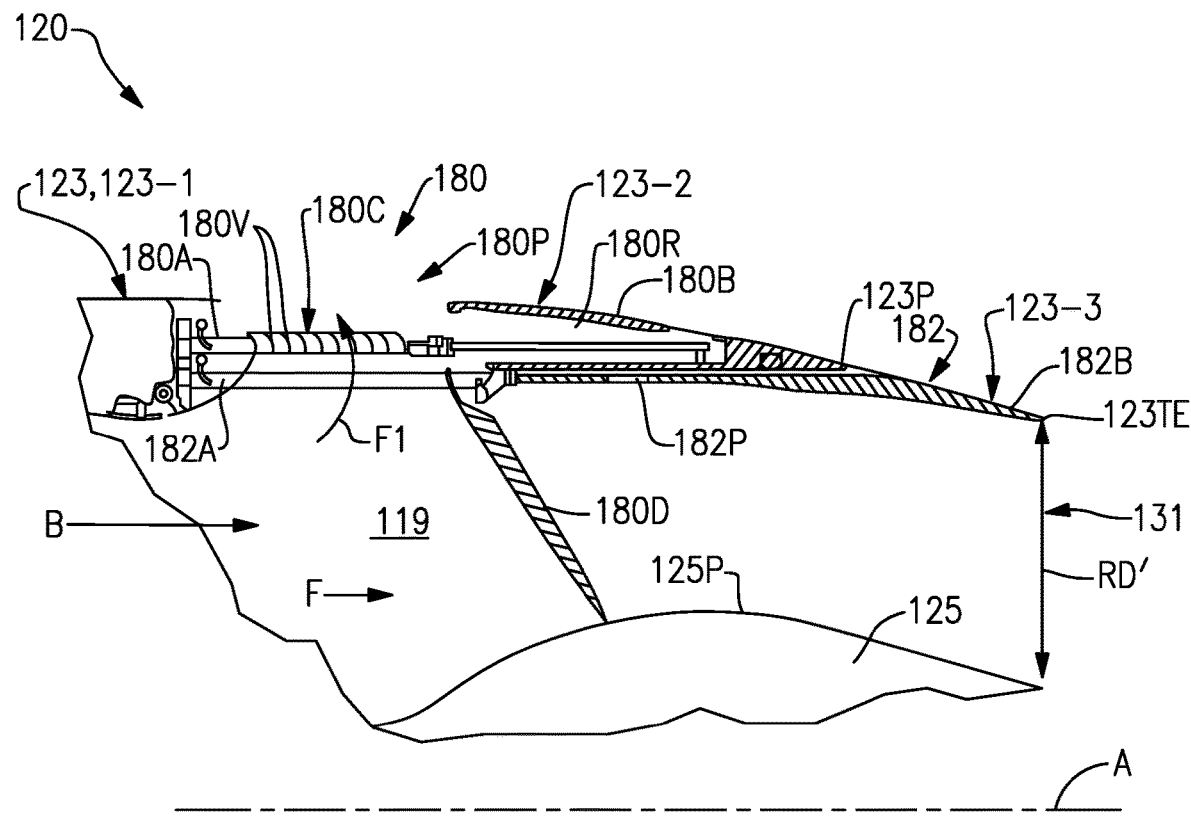
FIG. 7C is a partial cross section view of the thrust reverser and the variable area nozzle of FIG. 7A in deployed positions.

Referring to FIGS. 7A-7C, with continuing reference to FIGS. 5-6, the nacelle 123 can include at least one thrust reverser 180 and/or a variable area fan nozzle (VAFN) 182 for adjusting various characteristics of the bypass flow. FIG. 7A illustrates the thrust reverser 180 and the variable area fan nozzle 182 in stowed positions. FIG. 7B illustrates the thrust reverser 180 in the stowed position and the variable area fan nozzle 182 in a deployed position. FIG. 7C illustrates the thrust reverser 180 in a deployed position and the variable area fan nozzle 182 in the stowed position. The nacelle 123 includes a stationary portion 123-1 mounted to the fan case 115, a first moveable portion 123-2 and a second movable portion 123-3. The moveable portions 123-2, 123-3 are moveable relative to the stationary portion 123-1 and relative to each other.

The thrust reverser 180 is operable to convey airflow in the bypass flow path B for producing reverse thrust such as during approach and/or landing conditions of an aircraft associated with the engine 120. The thrust reverser 180 includes a thrust reverser body 180B, which is configured with the first moveable portion 123-2 of the nacelle 123. The thrust reverser body 180B may have a generally tubular geometry. The thrust reverser 180 can include one or more blocker doors 180D, one or more actuators 180A, and/or one or more cascades 180C of turning vanes 180V arranged circumferentially about the engine axis A.

The thrust reverser body 180B can include at least one recess 180R that houses the cascades 180C and the actuators 180A when the thrust reverser 180 is in the stowed position. The cascades 180C are dimensioned to span across a reversal port 180P when the thrust reverser 180 is in the deployed position, as illustrated by FIG. 7C. The cascade 180C selectively communicates airflow from the bypass duct 119 outwardly through the reversal port 180P in the deployed position. The cascade 180C can extend axially aft of both the row 166 of guide vanes 168 and the bypass port 174 with respect to the engine axis A, and the row 168 of guide vanes 168 can be situated axially forward of the blocker doors 180D relative to the engine axis A, as illustrated by FIGS. 5-6.

Each blocker door 180D is pivotally connected to the thrust reverser body 180B. The bypass port 174 can be established axially forward of the blocker doors 180D with respect to the engine axis A, as illustrated in FIGS. 5-6. The actuators 180A are operable to axially translate the thrust reverser body 180B between the stowed and deployed positions. As the thrust reverser body 180B translates aftwards, the blocker doors 180B pivot radially inward into the bypass duct 119 and divert at least some or substantially all of the bypass airflow F as flow F1 through the cascades 180C to provide the reverse engine thrust, as illustrated in FIG. 7C. In other examples, the cascades 180C are configured to translate axially with a respective thrust reverser body 180B. The thrust reverser body 180B and/or cascades 180C can include one or more circumferential segments that synchronously or independently translate or otherwise move between deployed and stowed positions.

The variable area fan nozzle 182 includes a nozzle body 182B and one or more actuators 182A. The nozzle body 182B is configured with the second movable portion 123-3 of the nacelle 123, and is arranged radially within and may nest with the thrust reverser body 180B. The nozzle body 182B may have a generally tubular geometry that extends about an axially contoured outer periphery 125P of the core cowling 125. The actuators 182A are operable to axially translate the nozzle body 182B between the stowed position of FIG. 7A and the deployed position of FIG. 7B. As the nozzle body 182B translates aftwards, a radial distance RD of the bypass exit 131 between a trailing edge or aft end 123TE of the nacelle 123 and the outer periphery 125P of the core cowling 125 established at the stowed position may change (e.g., increase) to a radial distance RD' and thereby change (e.g., increase) a flow area of the bypass exit 131. In this manner, the variable area fan nozzle 182 may adjust a pressure drop or ratio across the bypass flowpath B defined by the bypass duct 119 by changing the flow area of the bypass exit 131.

The variable area fan nozzle 182 can define or otherwise include at least one auxiliary port 182P to vary the bypass flow. The auxiliary port 182P can be established in the nozzle body 182B, as illustrated by FIGS. 7A-7C. The auxiliary port 182P is moveable relative to a trailing edge portion 123P of the first moveable portion 123-1 of the nacelle 123 to selectively block and open the auxiliary port 182P. The auxiliary port 182P is opened as the nozzle body 182B translates axially aftwards relative to the engine axis A. A flow area through the auxiliary port 182P augments the flow area of the bypass exit 131, thereby increasing an effective flow area of the variable area fan nozzle 182. The variable area fan nozzle 182 therefore may adjust a pressure drop or ratio across the bypass flowpath B defined by the bypass duct 119 while translating the nozzle body 182B over a relatively smaller axial distance. In the illustrative example of FIGS. 5-6, the variable area fan nozzle 182 is omitted.

Referring to FIG. 8A, with continuing reference to FIG. 5, the blades 162 can be dimensioned to provide a relatively radially compact engine arrangement. Each of the blades 162 extends in the radial direction R between a 0% span position at the hub 164 and a 100% span position at a tip 162T. A tip radius RT of the blades 162 is established between a radially outermost portion of the tip 162T and the engine axis A. A forwardmost portion of a leading edge 162LE of each the blades 162 is arranged along a first reference plane REF1. The first reference plane REF1 is perpendicular to the engine axis A. A hub radius RH is established along the first reference plane REF1 between an outer periphery of the hub 164 and the engine axis A. The tip radius RT can be between 35 and 60 inches, or more narrowly between 40 and 55 inches, for example.

Each of the blades 162 extends in the radial direction R between the 0% span position and the 100% span position to establish a geometric hub-to-tip ratio (RH:RT). The hub-to-tip ratio (RH:RT) can be less than or equal to about 0.4, or more narrowly greater than or equal to about 0.1, measured relative to the forwardmost portion of the leading edge 162LE of the blades 162. In examples, the hub-to-tip ratio (RH:RT) is between 0.16-0.36, or more narrowly between 0.2-0.3. In examples, the hub-to-tip ratio (RH:RT) is established such that a maximum value of the fan pressure ratio across the blade 162 alone is less than or about equal to about 1.45 measured at cruise at 0.8 Mach and 35,000 feet. In further examples, a maximum value of the fan pressure ratio is greater than or equal to about 1.1, or more narrowly less than or equal to about 1.35. The fan pressure ratios and hub-to-tip ratios disclosed herein can be utilized alone or in combination to establish relatively high bypass turbo fan engine arrangements.

The flow splitters 170, 172 are arranged at respective positions relative to each other and the row 160 of blades 162 to establish a predetermined distribution of airflow through the bypass, intermediate and core flow paths B, I, C in operation. A forwardmost edge 170F of the first flow splitter 170 is situated in the radial and axial directions R, H at a first splitter position P1 relative to the engine axis A. The first splitter position P1 is established along a second reference plane REF2. A forwardmost edge 172F of the second flow splitter 172 is situated in the radial and axial directions R, H at a second splitter position P2 relative to the engine axis A. The second splitter position P2 is established along a third reference plane REF3. The reference planes REF2, REF3 are perpendicular to the engine axis A.

The reference planes REF2, REF3 can be established at the same position, or at different positions relative to the engine axis A to establish a cascade arrangement. For example, the forwardmost edge 172F of the second flow splitter 172 can be axially aft of the forwardmost edge 170F of the first flow splitter 170 with respect to the engine axis A. The forwardmost edges 170F, 172F of the flow splitters 170, 172 are axially forward of the leading edges 168LE of the row 166 of guide vanes 168 at the 0% span position with respect to the engine axis A. The forwardmost edges 170F, 172F can be dimensioned to extend axially forward of the geared architecture 148 relative to the engine axis A, as illustrated by FIG. 8A, which can establish a relatively compact core engine arrangement.

Referring to FIG. 8B, with continuing reference to FIG. 8A, a first annulus area A1 is established by, and between, inner and outer diameter surfaces 119A, 119B of the bypass duct 119 at the forwardmost edge 170F of the first flow splitter 170. A second annulus area A2 is established by, and between, inner and outer diameter surfaces 121A, 121B of the second duct 121 at the forwardmost edge 170F of the first flow splitter 170. A third annulus area A3 is established by, and between, inner and outer diameter surfaces 133A, 133B of the entrance duct 133 at the second flow splitter 172. The annulus areas A1, A2, A3 extend about the engine axis A to establish a portion of the respective flow paths B, I, C.

The annulus areas A1, A2, A3 can be dimensioned to establish a predetermined distribution of airflow to the flow paths B, I, C in operation. A first geometric bypass area ratio (A1:A2) associated with the first flow splitter 170 is defined as the first annulus area A1 divided by the second annulus area A2. A second geometric bypass area ratio (A1:A3) associated with the second flow splitter 172 is defined as the first annulus area A1 divided by the third annulus area A3. The annulus areas A1, A2, A3 can be dimensioned to establish a predetermined value of the first bypass area ratio (A1:A2) and a predetermined value of the second bypass area ratio (A1:A3). In examples, the first bypass area ratio (A1:A2) is greater than or equal to about 10 to establish a relatively high bypass turbo fan arrangement. In examples, the first bypass area ratio (A1:A2) is less than or equal to about 35, or more narrowly less than or equal to about 20. The second bypass area ratio (A1:A3) is greater than the first bypass area ratio (A1:A2). For example, a value of the second bypass area ratio (A1:A3) can be between about 150-250% of the first bypass area ratio (A1:A2), such as approximately twice or 200% of the first bypass area ratio (A1:A2). In examples, the second bypass area ratio (A1:A3) is greater than or equal to about 15, or more narrowly greater than or equal to about 20.

Referring back to FIG. 8A, the forwardmost edges 170F, 172F of the flow splitters 170, 172 can be dimensioned relative to a span of the blades 162 to establish the predetermined distribution of airflow through the bypass, intermediate and core flow paths B, I, C in operation. In examples, the first splitter position P1 can be radially aligned with or radially inward of a 25% span position of the blades 162, or more narrowly can be radially aligned with or radially outward of a 10% span position of the blades 162 relative to the radial direction R, such as between about 16-22% span. The second splitter position P2 can be radially aligned with or radially outward of a 5% span position of the blades 162, or more narrowly can be radially aligned with or radially inward of a 15% span position of the blades 162 relative to the radial direction R, such as between about 8-13% span. The splitter positions P1, P2 can be established at a radial distance of at least 5% span apart from each other relative to the blades 162 such that a relatively larger amount of airflow is communicated to the intermediate flow path I and bypasses the guide vanes 168. In examples, the radial distance between the splitter positions P1, P2 is between about 6-12% span, relative to the blades 162. The blades 162 can have any of the stagger angles α and/or camber κ values disclosed herein at the respective spanwise positions of the first splitter position P1 and/or second splitter position P2 to convey airflow in a predetermined direction towards the splitters 170, 172, which can improve efficiency.

The guide vanes 168 and flow splitters 170, 172 can be arranged relative to the fan blades 162 to establish a relatively axially compact envelope. The leading edges 162LE of the blades 162 at the 100% span position are established along a fourth reference plane REF4. The leading edges 168LE of the guide vanes 168 at the 100% span position are established along a fifth reference plane REF5. The reference planes REF4, REF5 are perpendicular to the engine axis A. A first axial length L1 is established between the reference planes REF4, REF5. In examples, a ratio (L1:RT) of the first axial length L1 divided by the tip radius RT is greater than or equal to about 0.5, which can reduce fan noise propagation through the bypass flow path B. The ratio (L1:RT) can be less than or equal to about 0.75, which can establish a relatively axially compact fan section. A second axial length L2 is established between the first and second splitter positions P1, P2 along the reference planes REF2, REF3 relative to the engine axis A. In examples, a ratio (L2:L1) of the second axial length L20 divided by the first axial length L1 is less than or equal to about 0.5, or more narrowly between about 0.1 and about 0.3, which can further establish a relatively axially compact engine.

Figure 9A:
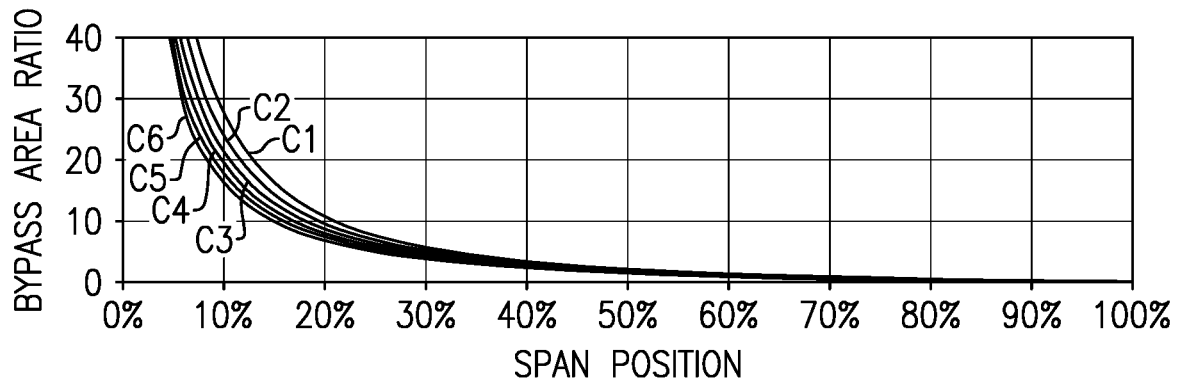
FIG. 9A illustrates an example plot of bypass area ratio with respect to span position.
Figure 9B:
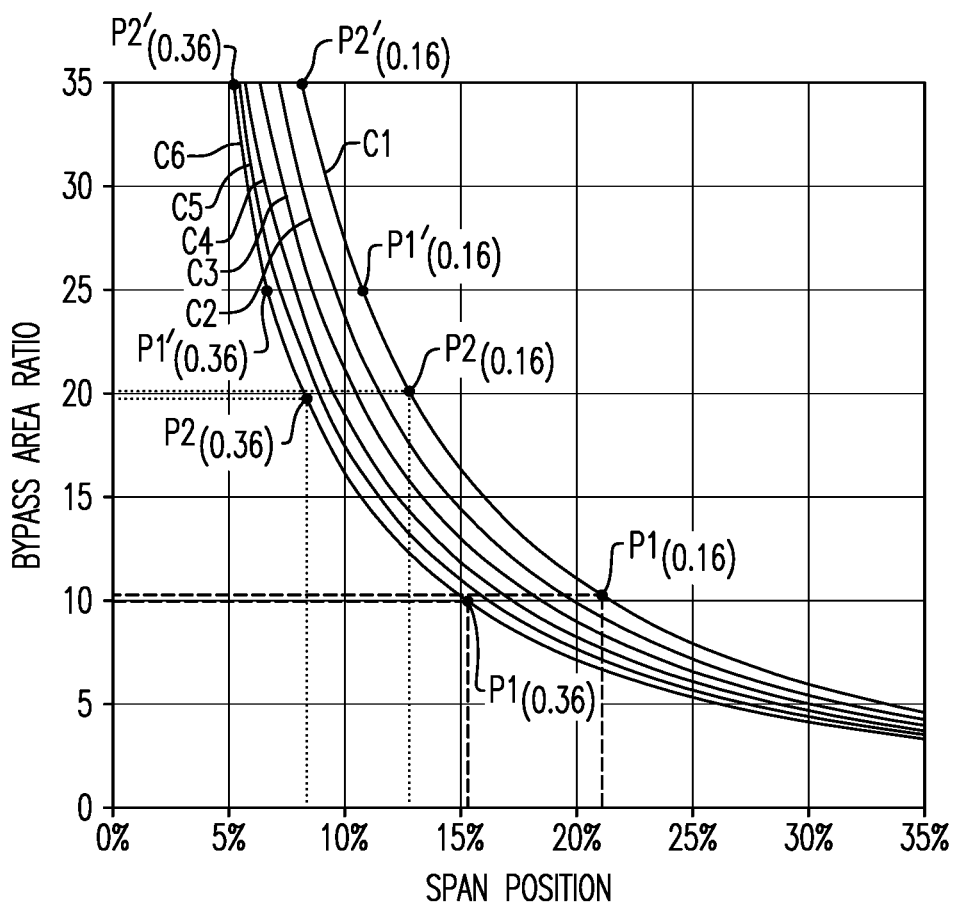
FIG. 9B illustrates selected portions of the plot of FIG. 9A.

FIG. 9A illustrates a plot of bypass area ratio relative to airfoil span position, such as span positions of the blades 162. FIG. 9B illustrates selected portions of FIG. 9A. Example profiles or curves C1-C6 are shown. The curves C1-C6 correspond to fan or rotor arrangements having hub-to-tip ratios (RH:RT) of 0.16, 0.20, 0.24, 0.28, 0.32, 0.36, respectively. The fan 142 can be dimensioned to establish any of the hub-to-tip ratios (RH:RT) and corresponding values along the curves C1-C6.

Each curve C1-C6 can be established as function of annulus area associated with respective bypass area ratios. Splitter position values for each % span position along the respective curve C1-C6 can be defined in one of the following ways:

$$\% \text{ span position} = [(MR-RH)/(RT-RH)]*100 \quad \text{Equation 1}$$

$$\% \text{ span position} = [(MR/RT-\lambda))/(1-\lambda)]*100 \quad \text{Equation 2}$$

where (MR) is the radial splitter position of the respective splitter 170, 172, (RH) is the hub radius and (RT) is the tip radius as previously defined, and ($\lambda$) is the hub-to-tip ratio (RH:RT). Since the annulus areas established by the splitters are non-linear, the corresponding curves C1-C6 are also non-linear.

The plot of curves C1-C6 can serve as a nomograph utilized to select radial locations of the first and second positions P1, P2 of the flow splitters 170, 172 with respect to hub-to-tip (RH:RT) ratio and/or bypass area ratio (A1:A2), (A1:A3), or vice versa. For example, referring to FIG. 9B, the fan 142 can establish a hub-to-tip (RH:RT) ratio of 0.16 corresponding to the curve C1. The radial location of the first and second splitter positions P1, P2 of the flow splitters 170, 172 correspond to points $P1_{(0.16)}$, $P2_{(0.16)}$ selected along the curve C1. The points $P1_{(0.16)}$, $P2_{(0.16)}$ can be selected with respect to a predetermined bypass area ratio. For example, point $P1_{(0.16)}$ of the first flow splitter 170 can be established in the radial direction R at about a 21.5% span position of the blades 162. Point $P1_{(0.16)}$ corresponds to a first bypass area ratio (A1:A2) of about 10 and a mass average fan pressure ratio of about 1.260. The radial location of the second flow splitter 172 can be determined by assuming analytically that the second flow splitter 172 is the first flow splitter 170 (e.g., a single flow splitter arrangement). The point $P2_{(0.16)}$ of the second flow splitter 172 can be established in the radial direction R at about a 13.1% span position of the blades 162. Point $P2_{(0.16)}$ corresponds to a second bypass area ratio (A1:A3) of about 20 and a mass average fan pressure ratio of about 1.225. For the purposes of this disclosure, mass average fan pressure ratio is defined as an average pressure ratio across the blades 162 alone measured at cruise at 0.8 Mach and 35,000 feet between the 0% span position and the corresponding span position of the respective splitter 170, 172. The mass across the blades 162 associated with the mass average fan pressure ratio is approximately equal to the amount of the mass captured by the respective splitter 170, 172.

As another example, the fan 142 can establish a hub-to-tip (RH:RT) ratio of 0.36 corresponding to the curve C6. The radial location of the first and second splitter positions P1, P2 of the flow splitters 170, 172 correspond to points $P1_{(0.36)}$, $P2_{(0.36)}$ selected along the curve C6. Point $P1_{(0.36)}$ of the first flow splitter 170 can be established in the radial direction R at about a 15.5% span position of the blades 162. Point $P1_{(0.36)}$ corresponds to a first bypass area ratio (A1: A2) of about 10 and a mass average fan pressure ratio of about 1.260. Point $P2_{(0.36)}$ of the second flow splitter 172 can be established in the radial direction R at about a 7.6% span position of the blades 162. Point $P2_{(0.36)}$ corresponds to a second bypass area ratio (A1:A3) of about 20 and a mass average fan pressure ratio of about 1.185.

The flow splitters 170, 172 and other portions of the fan section 122 can be dimensioned with respect to any other values along the curves C1-C6. For example, points $P1'_{(0.16)}$, $P2'_{(0.16)}$ can be established along the curve C1 at about 11.0% and about 7.6% span corresponding to first and second bypass area ratios (A1:A2), (A1:A3) of about 25 and 35, respectively. As another example, points $P1'_{(0.36)}$, $P2'_{(0.36)}$ can be established along the curve C6 at about 7.0% and about 5.5% span corresponding to first and second bypass area ratios (A1:A2), (A1:A3) of about 20 and 35, respectively.

As illustrated by the curves C1-C6 of FIGS. 9B, for the same bypass area ratio, a lower hub-to-tip ratio (RH:RT) can result in the splitter positions P1, P2 of the splitters 170, 172 being relatively further away from the 0% span position of the blades 162. The splitters 170, 172 can be dimensioned with respect to relatively lower % span positions to establish relatively larger bypass area ratios, as illustrated by the curves C1-C6 of FIG. 9B.

Figure 10A:
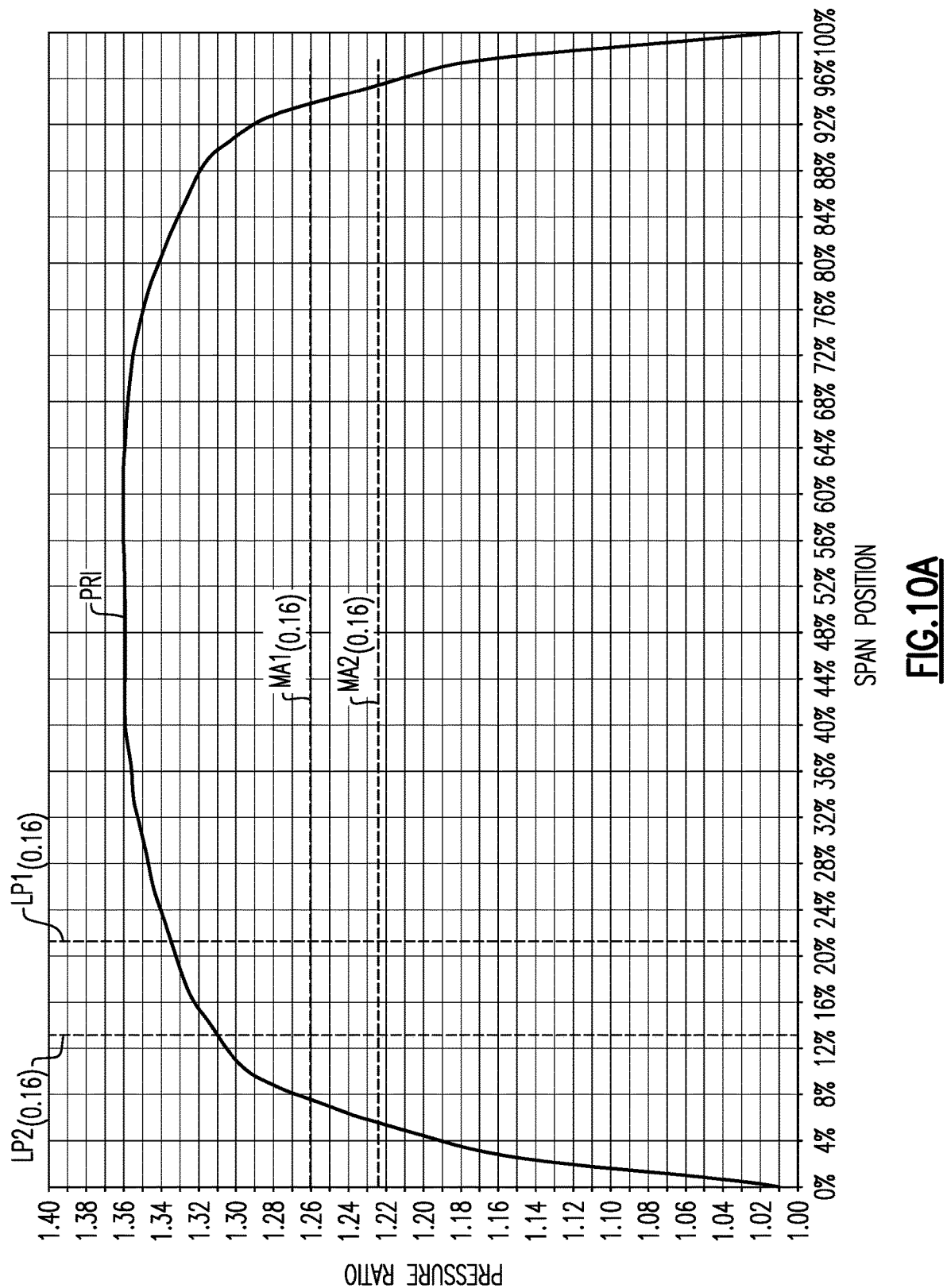
FIG. 10A illustrates an example plot of fan pressure ratio with respect to span position.
Figure 10B:
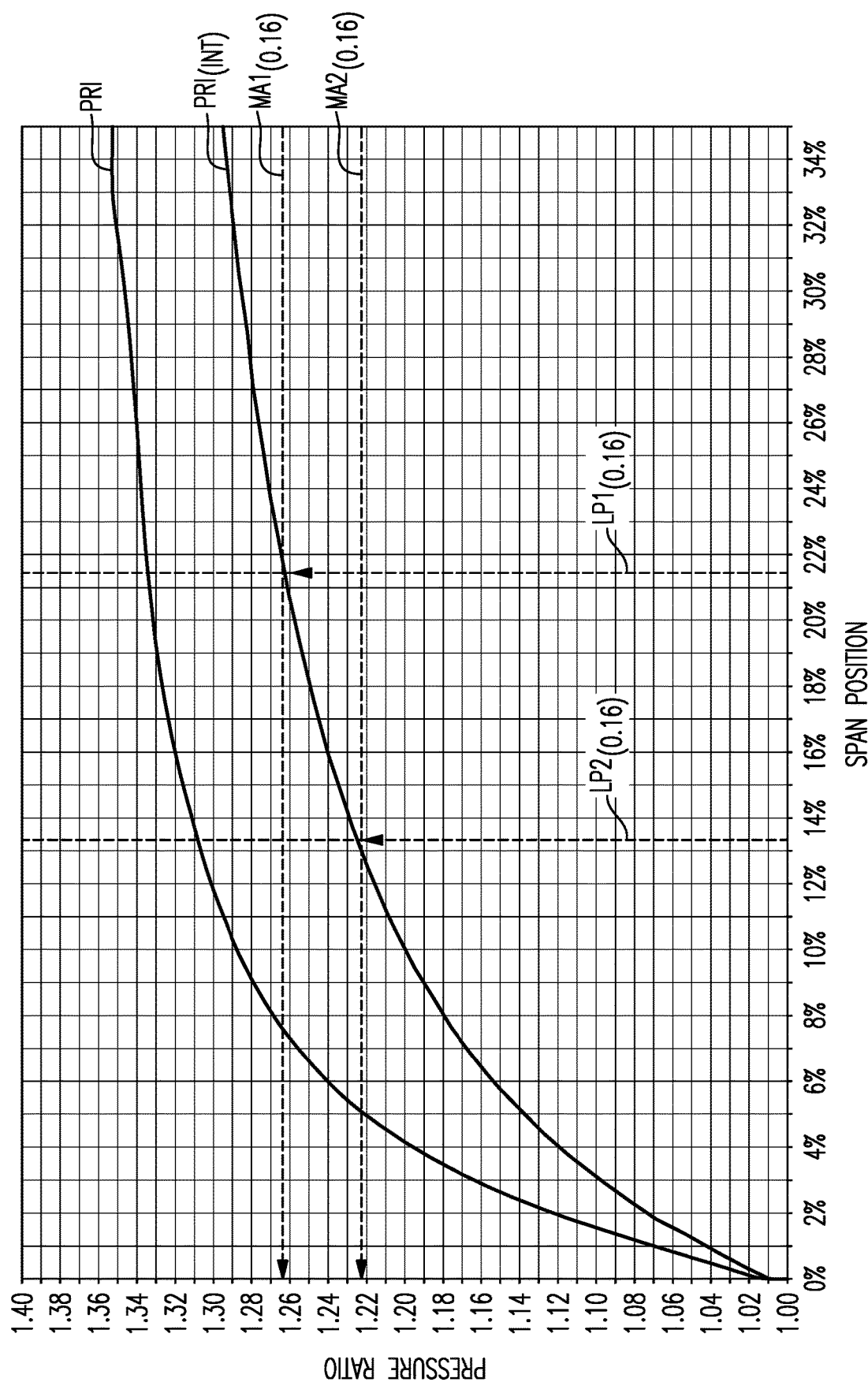
FIG. 10B illustrates selected portions of the plot of FIG. 10A.

FIG. 10A illustrates a plot of fan pressure ratio relative to airfoil span position, such as span positions of the blades 162. FIG. 10B illustrates selected portions of the plot of FIG. 10B. Curve PR1 corresponds to discrete fan pressure ratios at each span position. Lines $LP1_{(0.16)}$, $LP2_{(0.16)}$ correspond to the splitter positions $P1_{(0.16)}$, $P2_{(0.16)}$ of the splitters 170, 172 associated with a hub-to-tip ratio (RH:RT) equal to 0.16. Lines $MA1_{(0.16)}$, $MA2_{(0.16)}$ are the mass averaged fan pressure ratios corresponding to the respective splitter positions $P1_{(0.16)}$, $P2_{(0.16)}$. FIG. 10B depicts a curve PR1(NT) representing a spanwise integration of the discrete fan pressure ratios of curve PR1. An intersection of the lines $LP1_{(0.16)}$, $LP2_{(0.16)}$ corresponding to the points $P1_{(0.16)}$, $P2_{(0.16)}$ and the curve PR1(INT) establish a position of the respective lines $MA1_{(0.16)}$, $MA2_{(0.16)}$ relative to the y-axis. In the illustrative example of FIGS. 10A-10B, lines $MA1_{(0.16)}$, $MA2_{(0.16)}$ correspond to mass average fan pressure ratios of 1.260 and 1.225, respectively, which correspond to values previously discussed with respect to the points $P1_{(0.16)}$, $P2_{(0.16)}$ along the curve C1 of FIG. 9B.

Figure 11:
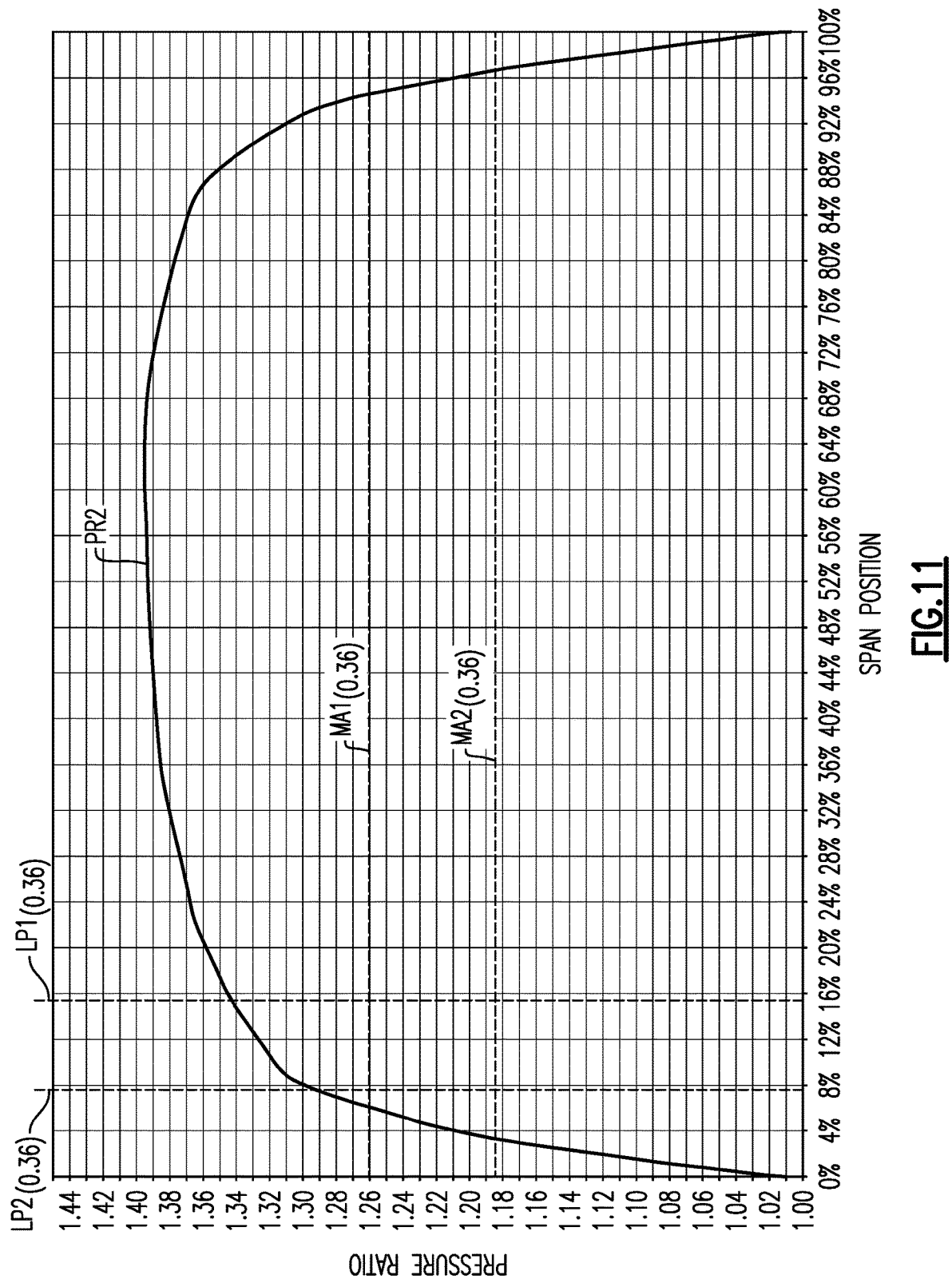
FIG. 11 illustrates another example plot of fan pressure ratio with respect to span position.

FIG. 11 illustrates another plot of fan pressure ratio relative to airfoil span position, such as span positions of the blades 162. Curve PR2 corresponds to discrete fan pressure ratios at each span position of the blade 162. Lines $LP1_{(0.36)}$, $LP2_{(0.36)}$ correspond to splitter positions $P1_{(0.36)}$, $P2_{(0.36)}$ of the splitters 170, 172 associated with a hub-to-tip ratio (RH:RT) equal to 0.36. In the illustrative example of FIG. 11, lines $MA1_{(0.36)}$, $MA2_{(0.36)}$ correspond to mass average fan pressure ratios of 1.260 and 1.185, respectively, which correspond to values previously discussed with respect to the points $P1_{(0.36)}$, $P2_{(0.36)}$ along the curve C6 of FIG. 9B.

The engine 120 can include a controller CONT (shown in dashed lines in FIG. 5 for illustrative purposes). The controller CONT is operable to cause the blocker doors 178, 184, thrust reverser 180 and variable area fan nozzle 182 to move between the various disclosed positions or modes. The controller CONT can include one or more computing devices, each having one or more of a computer processor, memory, storage means, network device and input and/or output devices and/or interfaces according to some example. The memory may, for example, include UVPROM, EEPROM, FLASH, RAM, ROM, DVD, CD, a hard drive, or other computer readable medium which may store data and/or the algorithms corresponding to the various functions of this disclosure. In other examples, the controller CONT is an analog or electromechanical device configured to provide the disclosed functions of this disclosure. The controller CONT can be a portion of a full-authority digital electronic control FADEC or an electronic engine control (EEC), another system, or a stand-alone system located within the aircraft remote from the engine 120.

FIG. 12 illustrates a plurality of discrete modes M1-M4 established by the position of the blocker door(s) 178 and position of the blocker door(s) 184 across the bypass port 174. The controller CONT can be programmed with logic or otherwise configured to cause the engine 120 to execute each of the modes M1-M4. During modes M1 and M3, the blocker doors 178 are stowed to establish an open position to at least partially communicate airflow through vent port 129. During modes M2 and M4, the blocker doors 178 are deployed to establish a closed position to at least partially block airflow from being communicated to the vent port 129. During modes M1 and M2, the bypass port 174 is open or uncovered to at least partially communicate airflow from the intermediate flow path I to the bypass flow path B. During modes M3 and M4, the bypass port 174 is closed or covered to at least partially block airflow being communicated from the intermediate flow path I to the bypass flow path B. The engine 120 can be operated in the first mode M1 during takeoff, for example, which may be associated with relatively lower engine inlet airflow such that the fan 142 communicates relatively more airflow which may improve fan stability.

The engine 120 can be operated in the first mode M1 and/or the second mode M2 during cruise, for example. The engine 120 can be operated in the second mode M2 during a beginning of climb condition to increase fan pressure ratio and generate relatively greater thrust. The thrust reverser 180 can be deployed during the second mode M2, for example, to increase an amount of airflow being communicated to the bypass flow path to the thrust reverser 180 for generating reverse thrust. The engine 120 can be operated in the third mode M3 during a middle of climb condition (i.e., between beginning climb and top of climb). The engine 120 can be operated in the fourth mode M4 during a top of climb condition to increase airflow to the core flow path C and bypass flow path B to maximize or otherwise increase thrust. The modes M1-M4 are exemplary and it should be appreciated the blocker door(s) 178 and bypass port 174 can be configured to establish fewer or more than four modes.

The controller CONT can be coupled to one or more sensors to determine any of the conditions disclosed herein, such as temperature, pressure and/or speed sensors operable to measure various conditions or states of the engine 120. Temperature and/or pressure sensors can be situated along the bypass, intermediate and/or core flow paths B, I, C, for example. Speed sensors can be situated adjacent to the rotors to determine a speed of the fan rotor, low spool, and/or high spool, for example. The controller CONT can utilize other data and information to determine any of the conditions disclosed herein, including aircraft velocity, altitude and throttle position. One would understand how to situate the sensors and program or otherwise configure the controller CONT with logic to obtain data and other information from the sensors and other systems in view of the teachings disclosed herein.

The engine 120 can be operated as follows. Referring to FIG. 5, the fan 142 is driven by the fan drive turbine 146 such that the blades 162 deliver airflow to the bypass, intermediate and core flow paths B, I, C. Driving the fan 142 can include driving the hub 164 of the fan 142 through the geared architecture 148 at a different speed than a speed of the fan drive turbine 146. The engine 120 can be operated in any of the modes disclosed herein, including the modes M1-M4 of FIG. 12. Airflow in the intermediate flow path I can be ejected from the bypass port 174 into the bypass flow path B to bypass the guide vanes 168. One or more blocker doors 178 can be selectively moved between open and closed positions to at least partially block airflow from the intermediate flow path I being communicated downstream to the core bypass duct 127 and vent port 129. One or more of the blocker doors 184 can be moved between open and closed positions to selectively communicate airflow through the bypass port 174 (184 shown in dashed lines in FIG. 8A for illustrative purposes).

Referring to FIG. 6, an operating line of the fan 142 at an operating condition such as takeoff can be shifted relatively further away from the stall line by upflowing the fan 142 in response to selectively communicating airflow to the vent port 129. One or more of the blocker doors 178 can be selectively moved to the open position to communicate airflow in the intermediate flow path I downstream to the vent port 129. Airflow communicated to the core bypass duct 127 can be ejected from the vent port 129 downstream of the bypass port 174 and/or bypass exit 131.

The disclosed splitter arrangements can improve aerodynamic loading and efficiency of the guide vanes, including lowering inlet Mach number to the guide vanes and improving aerodynamic diffusion in the guide vanes. The disclosed splitter arrangements can improve blade and guide vane performance near 0% span, which can be utilized to achieve a relatively more efficient spanwise pressure ratio across the entire span of the blade and the entire span of the guide vane. Engines made with the disclosed architecture, and including arrangements as set forth in this application, and with modifications coming from the scope of the claims in this application, thus provide very high efficient operation, relatively high stall margins, and are compact and lightweight relative to their thrust capability. Two-spool and three-spool direct drive engine architectures can also benefit from the teachings herein.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A section for a gas turbine engine comprising:
a rotor including a row of blades extending in a radial direction outwardly from a hub, wherein the hub is rotatable about a longitudinal axis such that the row of blades deliver flow to a bypass flow path, an intermediate flow path and a core flow path;
a first case surrounding the row of blades to establish the bypass flow path through a first duct;
a first flow splitter that divides flow between the bypass flow path and a second duct;
an aftmost row of guide vanes extending in the radial direction across the bypass flow path;
a second case including a second flow splitter radially inboard of the first flow splitter, wherein the second flow splitter is axially forward of an axially forwardmost compressor blade row of the gas turbine engine relative to the longitudinal axis that is surrounded by the second case, the second flow splitter divides flow from the second duct between the intermediate flow path and the core flow path, a forwardmost edge of the second flow splitter is axially aft of a forwardmost edge of the first flow splitter with respect to the longitudinal axis, and the forwardmost edges of the first and second flow splitters are axially forward of the aftmost row of guide vanes with respect to the longitudinal axis;
a bypass port that interconnects the intermediate and bypass flow paths at a position axially aft of a position of the aftmost row of guide vanes relative to the longitudinal axis, and the bypass port configured to direct flow from the intermediate flow path to the bypass flow path;
wherein each of the blades extends in the radial direction between a 0% span position at the hub and a 100% span position at a tip, leading edges of the blades at the 100% span position are established along a first reference plane, leading edges of the guide vanes at a 100% span position of the respective guide vanes are established along a second reference plane, the first and second reference planes are perpendicular to the longitudinal axis, a first axial length is established between the first and second reference planes, a tip radius is established between the tip of one of the respective blades and the longitudinal axis, and a ratio of the first axial length divided by the tip radius is greater than or equal to 0.5; and
wherein the forwardmost edge of the first flow splitter is situated in the radial direction at a first splitter position, the forwardmost edge of the second flow splitter is situated in the radial direction at a second splitter position, the first splitter position is radially aligned with or radially inward of a 25% span position of the blades, and the second splitter position being radially aligned with or radially outward of a 5% span position of the blades.

2. The section as recited in claim 1, wherein the hub is driven by a turbine through a geared architecture.

3. The section as recited in claim 1, wherein each of the blades extends in the radial direction between the 0% span position at the hub and the 100% span position at the tip to establish a hub-to-tip ratio, and the hub-to-tip ratio of each one of the blades is less than or equal to 0.4, the hub-to-tip ratio of each one of the blades measured relative to the forwardmost portion of the leading edge of the respective blade.

4. The section as recited in claim 1, wherein the first duct establishes the bypass flow path, the second duct branches between the intermediate and core flow paths at the second flow splitter, a first annulus area is established by the first duct at the forwardmost edge of the first flow splitter, a second annulus area is established by the second duct at the forwardmost edge of the first flow splitter, a bypass area ratio is defined as the first annulus area divided by the second annulus area, and the bypass area ratio is greater than or equal to 10, and less than or equal to 35.

5. The section as recited in claim 4, wherein a maximum value of a pressure ratio across the blades alone is less than 1.45 at cruise at 0.8 Mach and 35,000 feet.

6. The section as recited in claim 4, wherein only one row of guide vanes extends in the radial direction across the bypass flow path and the row of guide vanes comprises the aftmost row of guide vanes.

7. The section as recited in claim 4, wherein each of the blades extends in the radial direction between the 0% span position at the hub and the 100% span position at the tip to establish a hub-to-tip ratio, and the hub-to-tip ratio of each one of the respective blades is between 0.16-0.36 measured relative to the forwardmost portion of the leading edge of the respective blade.

8. The section as recited in claim 7, wherein the row of blades establishes a blade quantity (BQ), the blade quantity (BQ) is at least 12 but not more than 20 blades, the aftmost row of guide vanes establishes a vane quantity (VQ), and the vane quantity (VQ) is at least 20 but not more than 40 guide vanes.

9. The section as set forth in claim 8, wherein a ratio of VQ/BQ is between 2.0 and 2.6.

10. The section as recited in claim 1, further comprising:
one or more blocker doors situated in the intermediate flow path downstream of the bypass port, and wherein the one or more blocker doors are moveable to direct flow from the intermediate flow path to the bypass port.

11. The section as set forth in claim 10, wherein:
the one or more blocker doors are configured to pivot from the second case towards the bypass flow path to direct flow from the intermediate flow path to the bypass port; and
louvers are situated in the bypass port, the louvers have an airfoil-shaped geometry and are arranged to direct flow from the intermediate flow path to the bypass flow path.

12. A gas turbine engine comprising:
a fan section including a fan having a row of blades, each extending in a radial direction between a 0% span position at a hub and a 100% span position at a respective tip, wherein the hub is rotatable about an engine longitudinal axis such that the row of blades deliver flow to a bypass flow path, an intermediate flow path and a core flow path;
a compressor section establishing the core flow path;
a turbine section that drives the fan section and the compressor section;
a fan case including a bypass duct surrounding the row of blades to establish the bypass flow path;
a housing including a first flow splitter that divides flow between the bypass flow path and a second duct;
an aftmost row of guide vanes in the bypass duct that extend in the radial direction across the bypass flow path;
an engine case including a second flow splitter radially inboard of the first flow splitter and that divides flow from the second duct between the intermediate flow path and the core flow path, wherein the second flow splitter is axially forward of an axially forwardmost compressor blade row of the compressor section that is surrounded by the engine case relative to the engine longitudinal axis, a forwardmost edge of the second flow splitter is axially aft of a forwardmost edge of the first flow splitter with respect to the engine longitudinal axis, and the forwardmost edges of the first and second flow splitters are axially forward of the row of aftmost guide vanes with respect to the engine longitudinal axis;
a bypass port that interconnects the intermediate and bypass flow paths at a position downstream of the aftmost row of guide vanes, and the bypass port configured to direct flow from the intermediate flow path to the bypass flow path;
wherein each of the blades extends in the radial direction between the 0% span position and 100% span position to establish a hub-to-tip ratio, and the hub-to-tip ratio of each one of the blades is less than or equal to 0.4 measured relative to a forwardmost portion of a leading edge of the respective blade;
the leading edges of the blades at the 100% span position are established along a first reference plane, leading edges of the guide vanes at a 100% span position of the respective guide vanes are established along a second reference plane, the first and second reference planes are perpendicular to the engine longitudinal axis, a first axial length is established between the first and second reference planes, a tip radius is established between the tip of one of the respective blades and the longitudinal axis, and a ratio of the first axial length divided by the tip radius is greater than or equal to 0.5; and
wherein the forwardmost edge of the first flow splitter is situated in the radial direction at a first splitter position, the forwardmost edge of the second flow splitter is situated in the radial direction at a second splitter position, the first splitter position is radially aligned with or radially inward of a 25% span position of the blades relative to the engine longitudinal axis, and the second splitter position is radially aligned with or radially outward of a 5% span position of the blades relative to the engine longitudinal axis.

13. The gas turbine engine as recited in claim 12, further comprising a geared architecture, wherein the turbine section includes a fan drive turbine, and the geared architecture drives the fan at a different speed than a speed of the fan drive turbine.

14. The gas turbine engine as recited in claim 12, further comprising one or more blocker doors situated in the intermediate flow path downstream of the bypass port, wherein the one or more blocker doors are moveable between a first position and a second position, wherein the one or more blocker doors are configured to communicate flow in the intermediate flow path to a vent port in the first position but are configured to block flow in the intermediate flow path to the vent port in the second position.

15. The gas turbine engine as recited in claim 14, wherein the vent port is axially aft of an exit of the bypass flow path with respect to the engine longitudinal axis.

16. The gas turbine engine as recited in claim 14, further comprising a thrust reverser including a cascade that selectively communicates airflow from the bypass duct, wherein the cascade extends axially aft of both the aftmost row of guide vanes and the bypass port with respect to the engine longitudinal axis.

17. The gas turbine engine as recited in claim 12, wherein:
the compressor section includes a first compressor and a second compressor, the first compressor comprises the axially forwardmost compressor blade row of the compressor section, and both the second flow splitter and an entrance of the intermediate flow path are axially forward of the compressor section relative to the engine longitudinal axis.

18. The gas turbine engine as recited in claim 17, wherein the first compressor includes three compressor blade rows.

19. The gas turbine engine as recited in claim 17, wherein the aftmost row of guide vanes extend in the radial direction across the intermediate flow path relative to the engine longitudinal axis.

* * * * *